(12) United States Patent
Okamoto et al.

(10) Patent No.: US 10,809,224 B2
(45) Date of Patent: Oct. 20, 2020

(54) GAS SENSOR CALIBRATION METHOD

(71) Applicant: NGK INSULATORS, LTD., Nagoya-shi, Aichi (JP)

(72) Inventors: Taku Okamoto, Nagoya (JP); Yuki Nakayama, Nagoya (JP); Soichiro Yoshida, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 284 days.

(21) Appl. No.: 16/035,750

(22) Filed: Jul. 16, 2018

(65) Prior Publication Data

US 2019/0025244 A1 Jan. 24, 2019

(30) Foreign Application Priority Data

Jul. 20, 2017 (JP) .................. 2017-140908

(51) Int. Cl.
  *G01N 27/407* (2006.01)
  *G01N 27/30* (2006.01)
  *G01N 27/406* (2006.01)
  *G01N 27/417* (2006.01)

(52) U.S. Cl.
  CPC ....... *G01N 27/4071* (2013.01); *G01N 27/301* (2013.01); *G01N 27/4067* (2013.01); *G01N 27/4076* (2013.01); *G01N 27/4077* (2013.01); *G01N 27/4175* (2013.01)

(58) Field of Classification Search
  CPC .......... G01N 27/4067; G01N 27/4175; G01N 27/76; G01N 27/4077; G01N 27/301; G01N 33/007
  See application file for complete search history.

(56) References Cited

U.S. PATENT DOCUMENTS

| 2016/0033447 A1 | 2/2016 | Nakasone et al. |
| 2017/0138894 A1* | 5/2017 | Okamoto ........... G01N 27/4076 |
| 2017/0167994 A1 | 6/2017 | Okamoto et al. |
| 2017/0184538 A1 | 6/2017 | Okamoto et al. |

FOREIGN PATENT DOCUMENTS

| JP | 2016-33510 A | 3/2016 |
| JP | 5918434 B1 | 5/2016 |
| JP | 2017-110967 A | 6/2017 |

* cited by examiner

*Primary Examiner* — Gurpreet Kaur
(74) *Attorney, Agent, or Firm* — Mattingly & Malur, PC

(57) ABSTRACT

A gas sensor includes a sensor element made of an oxygen-ion conductive solid electrolyte and is configured to determine a concentration of a measurement target gas component based on a sensitivity characteristic as a predetermined functional relation held between a sensor output and the concentration of the gas component. The sensor output is a potential difference generated between a sensing electrode of the sensor element heated to a predetermined sensor drive temperature and a reference electrode. At the reference electrode, Au is concentrated at a predetermined maldistribution degree on the surface of a noble metal particle. In the present invention, the sensitivity characteristic is calibrated so as to suit the maldistribution degree at the reference electrode, based on the value of a predetermined alternative maldistribution degree index acquired in a non-destructive manner by performing predetermined measurement while the sensor element is heated to the predetermined temperature.

12 Claims, 18 Drawing Sheets

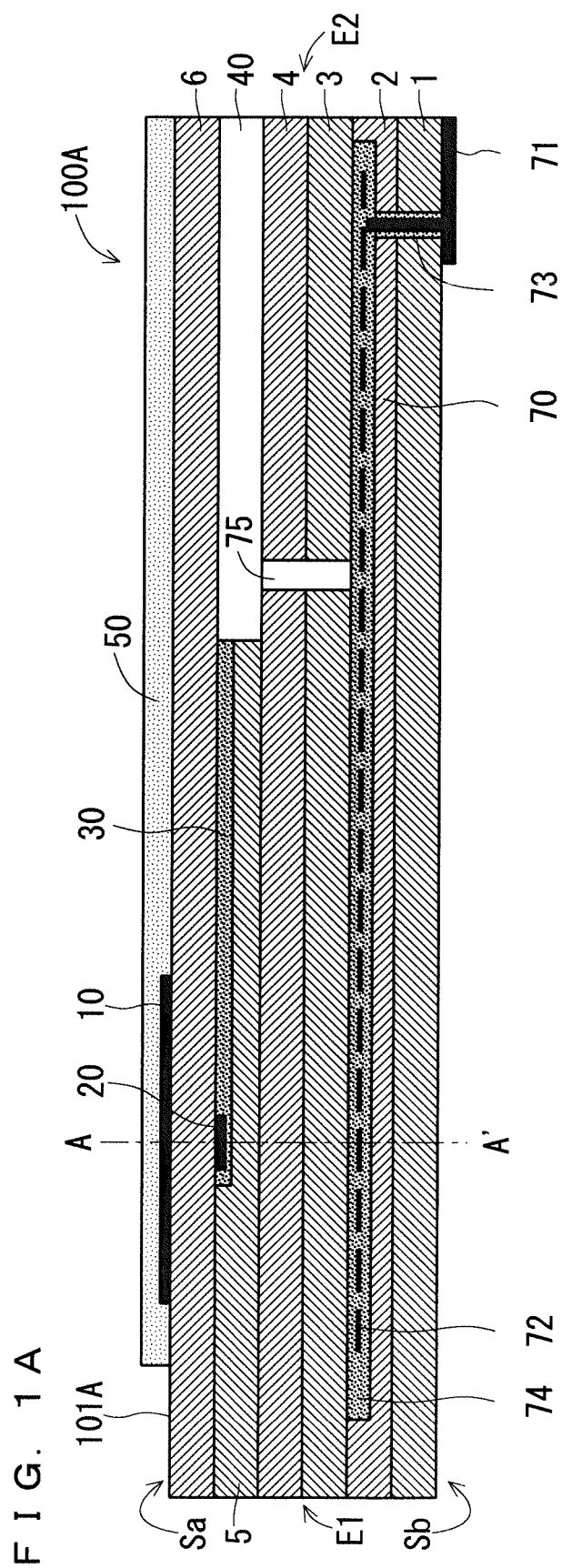
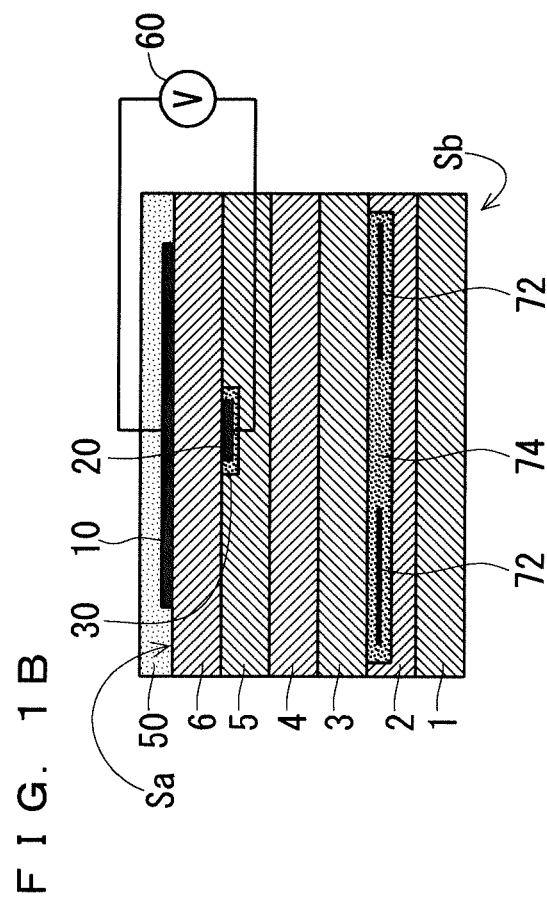
FIG. 1A
FIG. 1B

F I G . 9
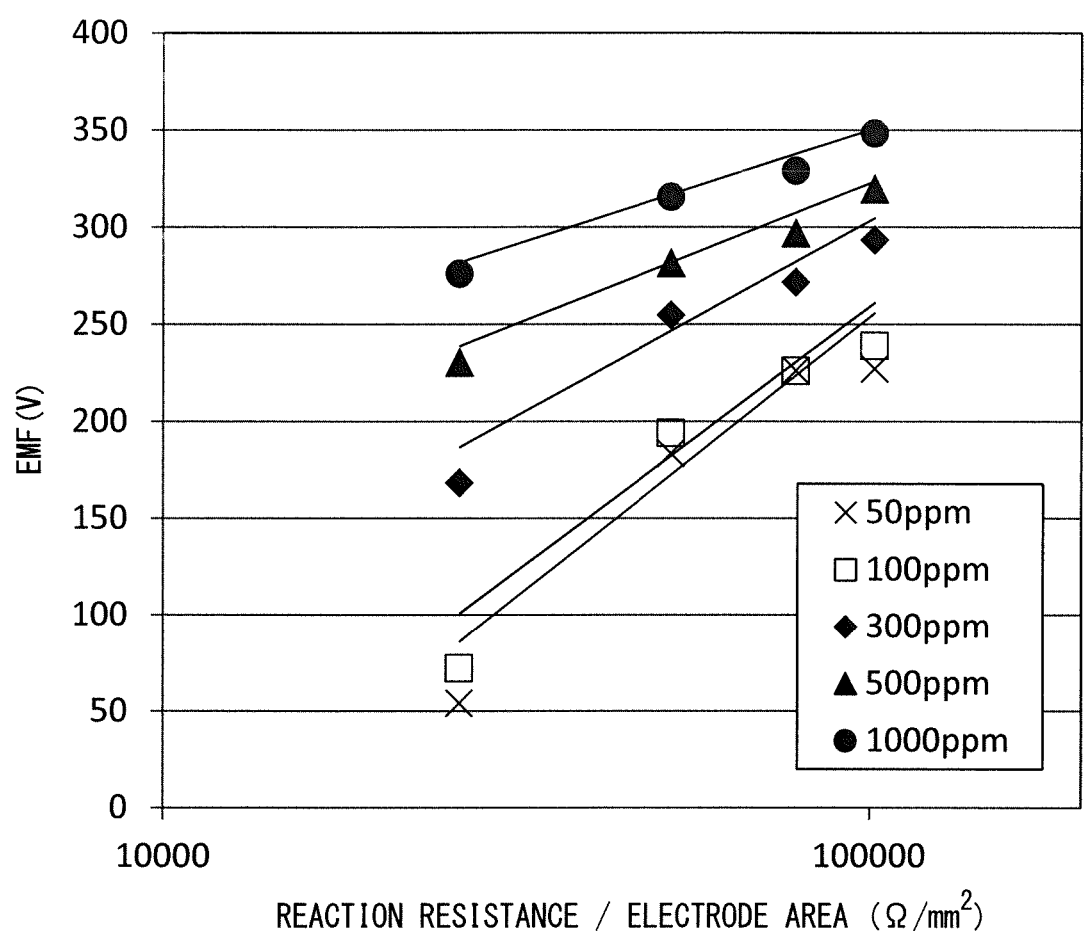

F I G . 1 1
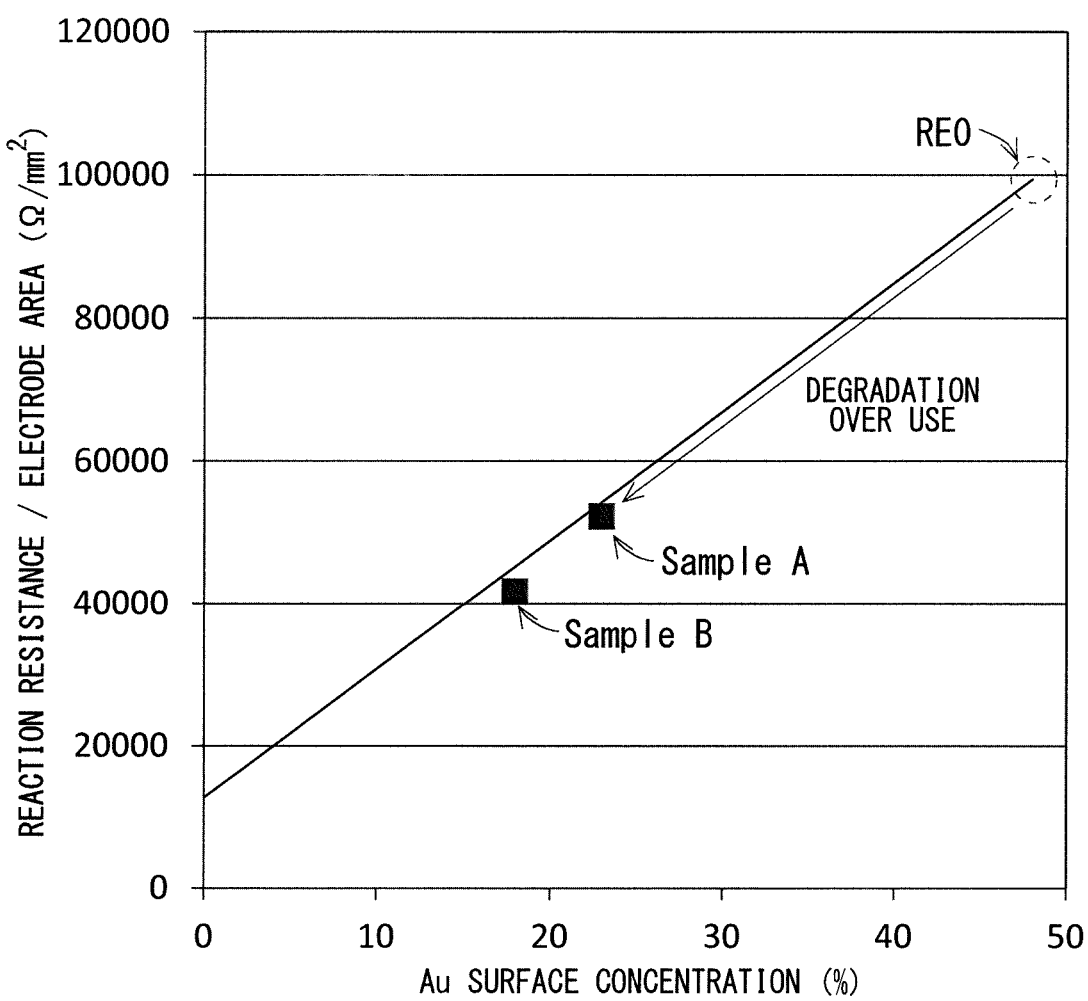

F I G . 1 2
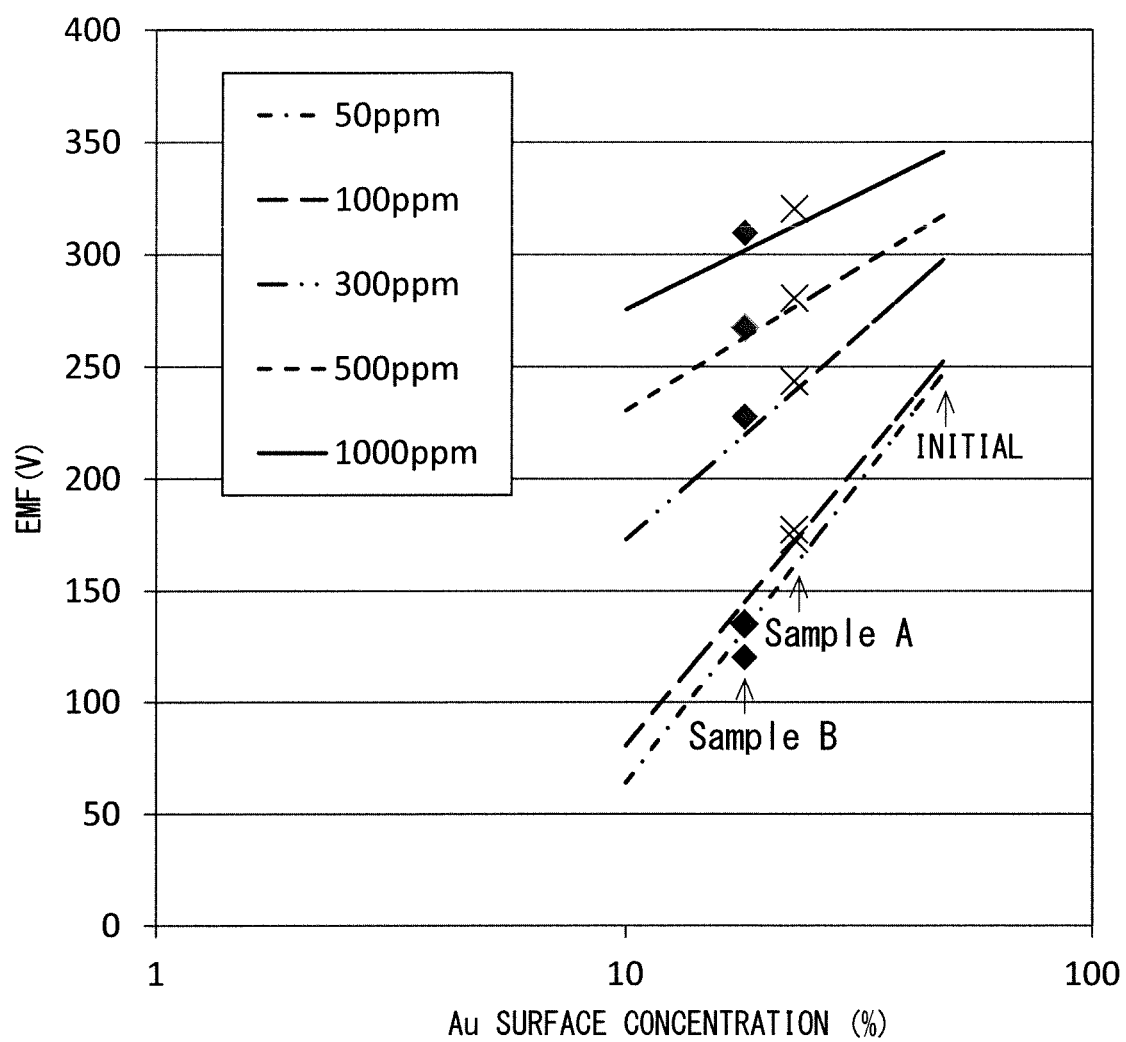

F I G . 1 3
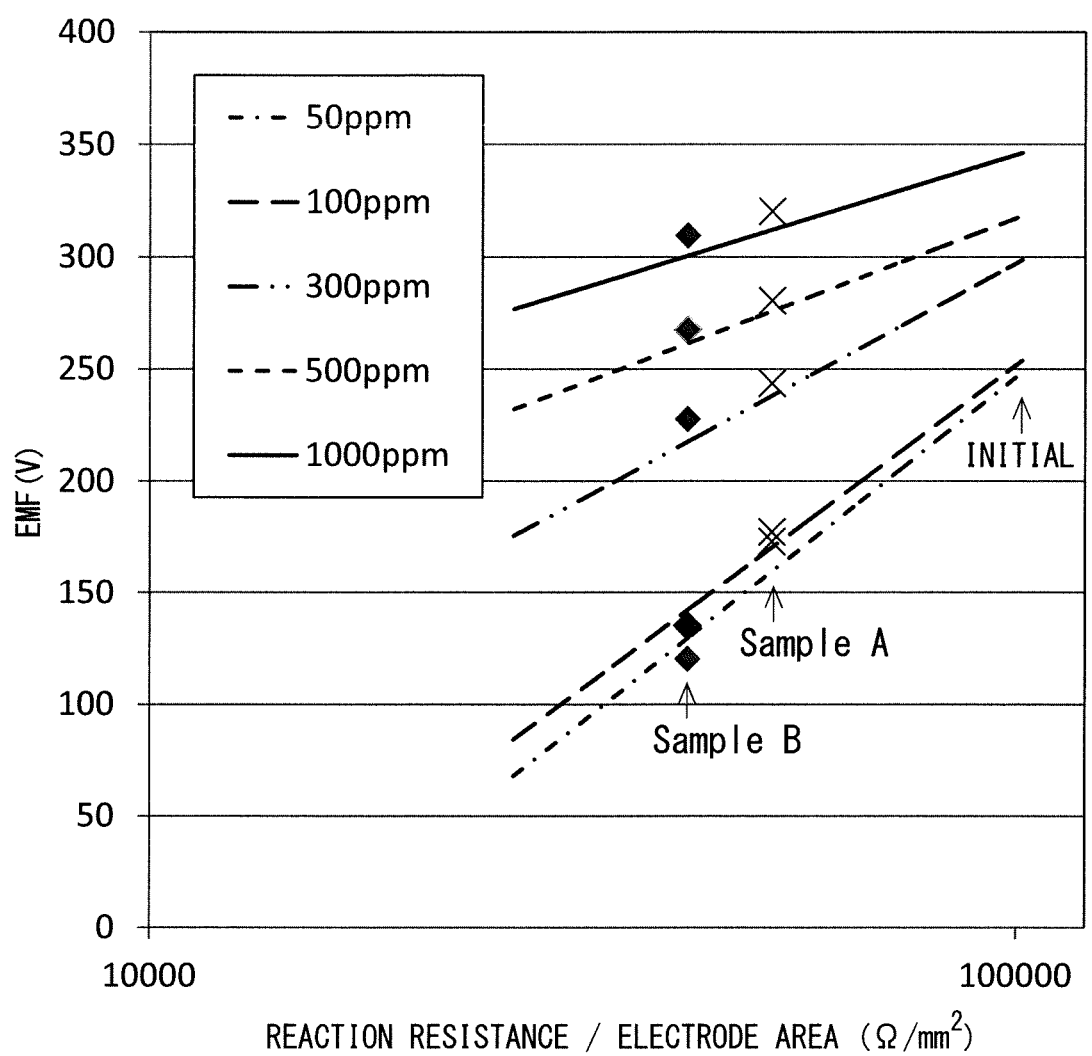

GAS SENSOR CALIBRATION METHOD

CROSS-REFERENCE TO RELATED APPLICATION

The present application claims priority from Japanese application JP 2017-140908, filed on Jul. 20, 2017, the content of which is hereby incorporated by reference into this application.

BACKGROUND OF THE INVENTION

Field of the Invention

The present invention relates to a mixed-potential type gas sensor, and particularly relates to calibration thereof.

Description of the Background Art

Gas sensors configured to sense a predetermined gas component in measurement gas to determine the concentration thereof come in various types such as a semiconductor type, a catalytic combustion type, an oxygen-concentration difference sensing type, a limiting current type, and a mixed-potential type. Some of these gas sensors include a sensor element mainly made of ceramic which is solid electrolyte such as zirconia.

Such gas sensors include publicly known mixed-potential gas sensors whose sensing target components is hydrocarbon gas or ammonia gas, having a sensing electrode made of a cermet of noble metals (specifically, Pt and Au) and oxygen-ion conductive solid electrolyte on a surface of the sensor element, and ensuring a sufficient detection sensitivity by maldistribution of Au on the surface of a noble metal particle forming the sensing electrode (by increasing the Au abundance ratio at the surface of a noble metal particle) (refer to Japanese Patent Application Laid-Open No. 2016-33510 and Japanese Patent No. 5918434, for example).

In addition, the processing of diagnosing the degradation degree of the sensing electrode due to use over time for such a mixed-potential type gas sensor is already publicly known (refer to Japanese Patent Application Laid-Open No. 2017-110967, for example).

As disclosed in Japanese Patent Application Laid-Open No. 2017-110967, it is known that the output value of a gas sensor such as the above-described mixed-potential type gas sensor including a sensor element mainly made of ceramic such as zirconia tends to change in spite that the concentration of a measurement target gas component in measurement gas remains the same, due to adhesion of a gas component of measurement gas and poisoning substances on an electrode surface over long-term use.

Such an output change can be dealt with by performing predetermined recovery processing to remove any adsorbed gas component. Specifically, it is possible to obtain the original (at an initial use stage) output value again or an output value as close to the original output value as possible. Thus, this output change is caused by degradation (reversible degradation) of the electrode due to a reversible factor.

Such recovery processing involves, for example, electric processing or heating processing. The electric processing is a method of recovering the output by alternately applying positive and negative potentials between electrodes paired through a solid electrolyte to refine the electrode or desorb any adsorbed substance. The heating processing is a method of recovering the output by exposing any adsorbed substance and poisoning substances to high temperature to desorb or burn (oxidize) the substances.

Japanese Patent Application Laid-Open No. 2017-110967 also describes output change of the gas sensor due to sintering of the material of the electrode because the electrode is exposed to high temperature atmosphere. However, as a result of intensive studies, the inventor of the present invention have found that sintering does not need to be considered practically to deal with the output change of the gas sensor over time when the gas sensor is actually used. This is because a firing temperature when the electrode is fired integrally with the sensor element at manufacturing of the sensor element included in the gas sensor is at least 1300° C. or higher (for example, 1400° C. approximately when the sensor element is mainly made of zirconia), whereas a temperature when the sensor element is heated directly by a heater inside or indirectly from the outside at actual use of the gas sensor is at most 900° C. or lower (for example, approximately 650° C. for a mixed-potential type gas sensor), and thus sintering can be deemed to be practically ineffective.

It has been also found that, in a case of a mixed-potential type gas sensor in which Au is concentrated (the Au abundance ratio is increased) on the surface of a noble metal particle included in the sensing electrode as disclosed in Japanese Patent Application Laid-Open No. 2016-33510 and Japanese Patent No. 5918434, the output value also changes due to Au evaporation from the sensing electrode over continuous use when the sensor element is used at a temperature relatively close to the Au melting point of 1064° C.

This output change is caused by the Au evaporation, which is the electrode degradation (irreversible degradation) due to an irreversible factor that cannot be recovered by the recovery processing. Thus, for a gas sensor to which the Au evaporation from the sensing electrode occurs, it may be difficult to achieve measurement accuracy equal to that at an initial use stage (at shipment) by only performing the recovery processing at a predetermined timing.

In aspects disclosed in Japanese Patent Application Laid-Open No. 2016-33510 and Japanese Patent No. 5918434, the Au abundance ratio at the surface of the sensing electrode provided in the sensor element indicates the area ratio of a portion covered by Au to a portion at which Pt is exposed on a surface of a noble metal particle forming the sensing electrode, and the Au abundance ratio is evaluated based on a result of surface composition analysis such as X-ray photoelectron spectroscopy (XPS) analysis or Auger electron spectroscopy (AES) analysis on the sensing electrode.

In this case, the sensing electrode, which is covered by a surface protective layer, needs to be exposed to perform the evaluation of the Au abundance ratio at the sensing electrode. However, as a matter of course, it is impossible to peel the surface protective layer or break the sensor element to evaluate the Au abundance ratio for the sensor element being actually used.

SUMMARY

The present invention relates to calibration of a mixed-potential type gas sensor including a sensor element made of an oxygen-ion conductive solid electrolyte, and is particularly directed to calibration of a sensitivity characteristic as a predetermined functional relation held between a sensor output and a concentration of a measurement target gas component.

A sensor element made of an oxygen-ion conductive solid electrolyte and included in a mixed-potential type gas sensor according to the present invention includes: a sensing electrode containing Pt and Au as noble metal components and configured to sense a predetermined measurement target gas component in measurement gas, Au being concentrated at a predetermined maldistribution degree on a surface of a noble metal particle; a reference electrode disposed in air; and a heater configured to heat the sensor element. The gas sensor is configured to determine a concentration of the measurement target gas component based on a sensitivity characteristic as a predetermined functional relation held between a sensor output and the concentration of the measurement target gas component. The sensor output is a potential difference generated between the sensing electrode and the reference electrode when the sensor element is heated to a predetermined sensor drive temperature by the heater. In a gas sensor calibration method according to the present invention, the sensitivity characteristic is calibrated so as to suit the maldistribution degree, based on a value of a predetermined alternative maldistribution degree index acquired in a non-destructive manner by performing predetermined measurement while the sensor element is heated to the predetermined temperature by the heater.

The predetermined measurement is, for example, complex impedance measurement to determine a reaction resistance between the sensing electrode and the reference electrode at the sensor drive temperature, or measurement of a direct-current resistance value or a direct-current current value between the sensing electrode and the reference electrode when a predetermined direct-current voltage is applied between the sensing electrode and the reference electrode. The alternative maldistribution degree index is, for example, the reaction resistance, the direct-current resistance value, or the direct-current current value.

According to the present invention, the reaction resistance between the sensing electrode and the reference electrode or the direct-current resistance or direct-current current therebetween at the predetermined applied voltage is used as an alternative index of an Au maldistribution degree originally calculated from a result of surface composition analysis such as XPS analysis or AES analysis for sensing electrodes and defined based on the area ratio of an Au exposed part on the surface of a noble metal particle of the sensing electrode, which allows calibration of the sensitivity characteristic of the gas sensor so as to suit the Au maldistribution degree without obtaining the Au maldistribution degree. Accordingly, degradation of measurement accuracy can be prevented or reduced even when the gas sensor is continuously used.

The gas sensor calibration method according to the present invention preferably includes the steps of: a) preparing, before start of use of the gas sensor, sensitivity characteristic map information that specifies a relation between the sensor output and the concentration of the measurement target gas component in accordance with the value of the alternative maldistribution degree index for a predetermined range of the alternative maldistribution degree index; b) measuring the value of the alternative maldistribution degree index at a predetermined timing after the start of use of the gas sensor; and c) calibrating based on the value of the alternative maldistribution degree index measured in the step b) and the sensitivity characteristic map information, the sensitivity characteristic in accordance with the measured value of the alternative maldistribution degree index.

More preferably, the gas sensor calibration method according to the present invention further includes the step of d) removing a gas component in the measurement gas adhering to the sensing electrode through energization to the sensing electrode or heating of the sensor element by the heater. The step b) follows the step d).

With this configuration, the influence of decrease of the reaction resistance or the direct-current resistance due to adhesion of a gas component to the sensing electrode can be excluded from calibration of the sensitivity characteristic of the gas sensor, which leads to more accurate calibration.

The present invention is intended to provide a gas sensor calibration method capable of preventing or reducing degradation of measurement accuracy even when a gas sensor is continuously used.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1A and 1B are sectional pattern diagrams each schematically illustrating a configuration of a gas sensor 100A;

FIG. 9 is a diagram obtained by redrawing the relation between the sensor output and the Au surface concentration, which is illustrated in FIG. 3, with the reaction resistance value per unit area as the horizontal axis;

FIG. 11 illustrates a plot of values of the reaction resistance per unit area of Samples A and B against the respective Au surface concentrations thereof;

FIG. 12 is a diagram illustrating the relation between the sensor output of measurement of ammonia gas as a measurement target component and the Au surface concentration of the sensing electrode 10 for Samples A and B;

FIG. 13 is a diagram obtained by plotting the relation between the sensor output and the Au surface concentration for Samples A and B, which is illustrated in FIG. 12, with the reaction resistance value per unit area as the horizontal axis;

DESCRIPTION OF THE PREFERRED EMBODIMENTS

<Exemplary Configuration of Gas Sensor>

Figure 2:
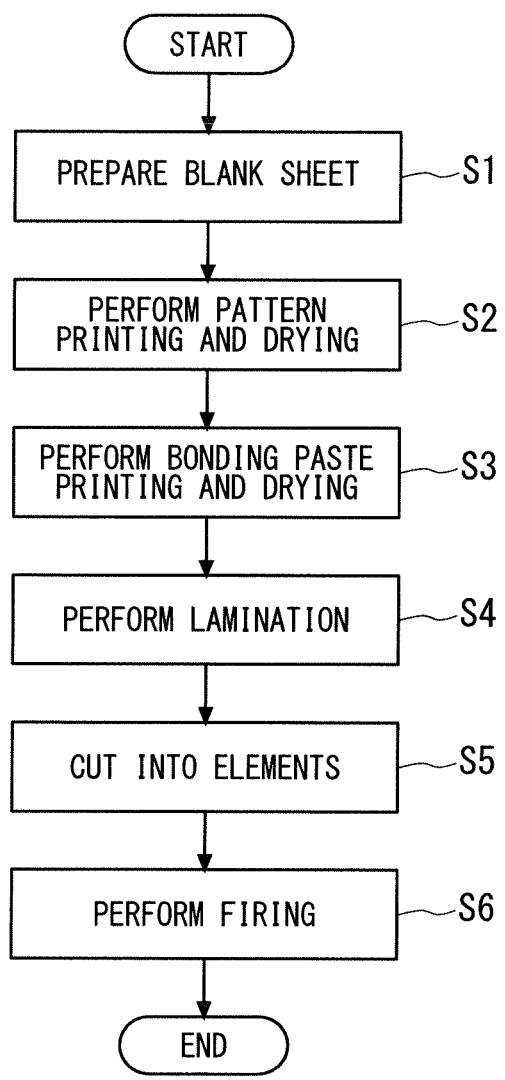
FIG. 2 is a diagram illustrating the flow of processing of manufacturing a sensor element 101A.

FIGS. 1A and 1B are sectional pattern diagrams each schematically illustrating a configuration of a gas sensor 100A as an exemplary target in a calibration method according to the present preferred embodiment. FIG. 1A is a vertical sectional view of a sensor element 101A, which is a main component of the gas sensor 100A, taken along the longitudinal direction of the sensor element 101A. FIG. 1B is a diagram illustrating a section of the sensor element 101A taken along line A-A' in FIG. 1A perpendicular to the longitudinal direction of the sensor element 101A. The calibration method according to the present preferred embodiment schematically relates to processing performed on the gas sensor 100A being continuously used, thereby preventing or reducing degradation of measurement accuracy thereof.

The gas sensor 100A is what is called a mixed-potential type gas sensor. Generally, the gas sensor 100A determines the concentration of a gas component as a measurement target in measurement gas by utilizing a potential difference generated between the sensing electrode 10 provided on the surface of the sensor element 101A mainly made of ceramic as oxygen-ion conductive solid electrolyte such as zirconia ($ZrO_2$) and a reference electrode 20 provided inside the sensor element 101A, the potential difference being attributable to the difference between the concentrations of the gas component near the both electrodes based on the principle of mixed potential.

More specifically, the gas sensor 100A preferably determines the concentration of a predetermined gas component in measurement gas that is exhaust gas present in an exhaust pipe of an internal combustion engine such as a diesel engine or a gasoline engine. Examples of gas components as measurement targets include hydrocarbon gas such as $C_2H_4$, $C_3H_6$, or n-C8, carbon monoxide (CO), ammonia ($NH_3$), steam ($H_2O$), nitrogen monoxide (NO), and nitrogen dioxide ($NO_2$). However, in the present specification, the hydrocarbon gas also includes carbon monoxide (CO) in some cases.

When a plurality of kinds of gas components are contained in measurement gas, the potential difference generated between the sensing electrode 10 and the reference electrode 20 has a value including contributions from all of the plurality of kinds of gas components in principle. However, in the same combinations of the contained gas components, the concentration values of individual kinds of gas can be individually obtained by preferably setting the drive temperature of the sensor element 101A and adjusting the properties (such as porosity and pore size) of a surface protective layer 50 to be described later. Alternatively, as for hydrocarbon gas, the concentrations of a plurality of kinds of hydrocarbon gas can be directly calculated in some cases. Certainly, it is acceptable that the gas sensor 100A is used under the condition that a gas component contained in measurement gas is limited to a particular gas component in advance and the concentration of the gas component is obtained.

In addition to the sensing electrode 10 and the reference electrode 20 described above, the sensor element 101A mainly includes a reference gas introduction layer 30, a reference gas introduction space 40, and the surface protective layer 50.

The sensor element 101A has a structure in which six layers, i.e., a first solid electrolyte layer 1, a second solid electrolyte layer 2, a third solid electrolyte layer 3, a fourth solid electrolyte layer 4, a fifth solid electrolyte layer 5, and a sixth solid electrolyte layer 6 each made of oxygen-ion conductive solid electrolyte are stacked in this order from the bottom in FIGS. 1A and 1B. The sensor element 101A additionally includes other components mainly between the layers or on an outer peripheral surface of the element. The solid electrolyte of which the six layers are made is fully airtight.

However, it is not essential that the gas sensor 100A include the sensor element 101A as such a six-layer laminated body. The sensor element 101A may be formed as a laminated body having a larger or smaller number of layers or may not have a laminated structure.

In the following description, for sake of convenience, a surface located above the sixth solid electrolyte layer 6 in FIGS. 1A and 1B is referred to as a front surface Sa of the sensor element 101A, and a surface located below the first solid electrolyte layer 1 in FIGS. 1A and 1B is referred to as a rear surface Sb of the sensor element 101A. When the concentration of a predetermined gas component in measurement gas is obtained by using the gas sensor 100A, a predetermined range extending from a distal end E1 at one end of the sensor element 101A and including at least the sensing electrode 10 is disposed in a measurement gas atmosphere, while the other portion including a base end E2 at the other end is disposed avoiding contact with the measurement gas atmosphere.

The sensing electrode 10 is an electrode for sensing measurement gas. The sensing electrode 10 is formed as a porous cermet electrode made of Pt containing Au at a predetermined ratio, in other words, a Pt—Au alloy, and zirconia. The sensing electrode 10 is provided in a substantially rectangular shape in plan view at a position closer to the distal end E1 that is one end in the longitudinal direction on the front surface Sa of the sensor element 101A. When the gas sensor 100A is used, a portion of the sensor element 101A extending at least to a portion in which the sensing electrode 10 is provided is exposed to measurement gas.

The catalytic activity of the sensing electrode 10 against a measurement gas component in measurement gas is disabled in a predetermined concentration range by preferably determining the composition of the Pt—Au alloy which constitutes the sensing electrode 10. In other words, the combustion reaction of a measurement target gas component at the sensing electrode 10 is prevented or reduced. Accordingly, in the gas sensor 100A, the potential of the sensing electrode 10 selectively varies in accordance with (has correlation with) the concentration of a measurement target gas component through electrochemical reaction. In other words, the potential of the sensing electrode 10 has characteristics of high concentration dependency on a measurement target gas component in a predetermined concentration range and low concentration dependency on any other component in measurement gas.

More specifically, in the sensor element 101A of the gas sensor 100A according to the present preferred embodiment, Au is concentrated on the surface of a Pt—Au alloy particle forming the sensing electrode 10. In other words, an Au abundance ratio, which is the area ratio of a portion covered by Au to a portion at which Pt is exposed on the surface of a noble metal (Pt—Au alloy) particle forming the sensing electrode 10, is increased. Accordingly, the potential of the sensing electrode 10 exhibits significant dependency on the concentration of a measurement target gas component in a predetermined concentration range.

As disclosed in Japanese Patent Application Laid-Open No. 2016-33510, the Au abundance ratio can be calculated from peak intensities of Au and Pt at detection peaks, which can be obtained by X-ray photoelectron spectroscopy (XPS), by using a relative sensitivity coefficient method. Alternatively, as disclosed in Japanese Patent No. 5918434, the Au abundance ratio can be calculated by using detected values of Au and Pt in an Auger spectrum, which can be calculated by performing Auger electron spectroscopy (AES) analysis on a surface of a noble metal particle.

The Au abundance ratio increases as the degree of concentration of Au (Au maldistribution degree) on the surface of a noble metal particle of the sensing electrode 10 increases.

A high Au maldistribution degree at the sensing electrode 10 means that the concentration of Au on the surface (Au surface concentration) of a noble metal particle of the sensing electrode 10 is high. The Au abundance ratio indicates the ratio of an area of a portion covered by Au to an area of a portion at which Pt is exposed on the surface of a noble metal particle, whereas the Au surface concentration corresponds to the ratio of an area of a portion at which Au is exposed to an area of a whole surface of a noble metal particle. In place of or together with calculation of the Au abundance ratio, the Au surface concentration can be calculated by using a result of the XPS (X-ray photoelectron spectroscopy) analysis or the AES (Auger electron spectroscopy) analysis described above for calculation of the Au abundance ratio. In addition, the Au abundance ratio and the Au surface concentration have a mutually convertible relation. This is because, when $S_{Au}$ and $S_{Pt}$ represent the areas of portions at which Au and Pt, respectively, are exposed on a surface of a noble metal particle, the Au abundance ratio is given by $S_{Au}/S_{Pt}$, and the Au surface concentration (%) is given by $100 \times S_{Au}/(S_{Au}+S_{Pt})$.

For example, when the area of the portion at which Pt is exposed is equal to the area of the portion covered by Au, in other words, when $S_{Au}=S_{Pt}$, the Au abundance ratio is one, and the Au surface concentration is 50%.

Thus, when a threshold is appropriately set, the Au surface concentration can be used as an index of the Au maldistribution degree in place of the Au abundance ratio.

The reference electrode 20 has a substantially rectangular shape in plan view and is provided inside the sensor element 101A and serves as a reference when the concentration of measurement gas is obtained. The reference electrode 20 is formed as a porous cermet electrode made of Pt and zirconia.

The reference electrode 20 is enough to be formed to have a porosity of 10% or more and 30% or less and a thickness of 5 μm or more and 15 μm or less. As illustrated in FIGS. 1A and 1B, the reference electrode 20 may have a plane size smaller than or equal to that of the sensing electrode 10.

The reference gas introduction layer 30 is made of porous alumina and provided to cover the reference electrode 20 inside the sensor element 101A. The reference gas introduction space 40 is an internal space provided near the base end E2 of the sensor element 101A. Air (oxygen), serving as a reference gas in the determination of the concentration of a measurement target gas component, is externally introduced to the reference gas introduction space 40.

The reference gas introduction space 40 and the reference gas introduction layer 30 are communicated with each other, so that the surrounding of the reference electrode 20 is constantly filled with air (oxygen) through the reference gas introduction space 40 and the reference gas introduction layer 30 when the gas sensor 100A is used. Thus, during the use of the gas sensor 100A, the reference electrode 20 always has a constant potential.

The reference gas introduction space 40 and the reference gas introduction layer 30 are prevented from contacting with measurement gas by the surrounding solid electrolyte. Thus, the reference electrode 20 does not come into contact with the measurement gas even when the sensing electrode 10 is exposed to the measurement gas.

In the configuration illustrated in FIGS. 1A and 1B, the reference gas introduction space 40 is provided such that a part of the fifth solid electrolyte layer 5 is communicated with the outside on the base end E2 side of the sensor element 101A. The reference gas introduction layer 30 is provided between the fifth solid electrolyte layer 5 and the sixth solid electrolyte layer 6 so as to extend in the longitudinal direction of the sensor element 101A. The reference electrode 20 is provided at a position below the center of gravity of the sensing electrode 10 in FIGS. 1A and 1B.

The surface protective layer 50 is a porous layer made of alumina and covering at least the sensing electrode 10 on the front surface Sa of the sensor element 101A. The surface protective layer 50 is provided as an electrode protective layer that prevents or reduces degradation of the sensing electrode 10 due to continuous exposure to measurement gas when the gas sensor 100A is used. In the configuration illustrated in FIG. 1A, the surface protective layer 50 covers not only the sensing electrode 10 but also a substantially entire portion of the front surface Sa of the sensor element 101A except for a predetermined range from the distal end E1.

As illustrated in FIG. 1B, the gas sensor 100A is provided with a potentiometer 60 capable of measuring the potential difference between the sensing electrode 10 and the reference electrode 20. FIG. 1B schematically illustrates wiring between the potentiometer 60 and each of the sensing electrode 10 and the reference electrode 20. However, in the actual sensor element 101A, a connection terminal (not illustrated) corresponding to each electrode is provided on the front surface Sa or the rear surface Sb on the base end E2 side, and a wiring pattern (not illustrated) connecting each electrode and the corresponding connection terminal is formed on the front surface Sa and inside the element. The sensing electrode 10 and the reference electrode 20 are each electrically connected with the potentiometer 60 through the wiring pattern and the connection terminal. Hereinafter, the potential difference between the sensing electrode 10 and the reference electrode 20, which is measured by the potentiometer 60 is also referred to as a sensor output or EMF.

The sensor element 101A further includes a heater part 70 configured to perform temperature adjustment involving heating and temperature maintenance of the sensor element 101A to increase the oxygen-ion conductivity of the solid electrolyte. The heater part 70 includes a heater electrode 71, a heater 72, a through-hole 73, a heater insulating layer 74, and a pressure diffusion hole 75.

The heater electrode 71 is formed in contact with the rear surface Sb of the sensor element 101A (a lower surface of the first solid electrolyte layer 1 in FIGS. 1A and 1B). Power can be supplied to the heater part 70 from the outside when the heater electrode 71 is connected with an external power source (not illustrated).

The heater 72 is an electric resistor provided inside the sensor element 101A. The heater 72 is connected with the heater electrode 71 through the through-hole 73, and generates heat with being powered externally through the heater electrode 71 to perform heating and temperature maintenance of the solid electrolyte forming the sensor element 101A.

In the configuration illustrated in FIGS. 1A and 1B, the heater 72 is buried while being vertically sandwiched between the second solid electrolyte layer 2 and the third solid electrolyte layer 3 in a range extending from the base end E2 to a position below the sensing electrode 10 near the distal end E1. With this configuration, the entire sensor element 101A can be adjusted to a temperature at which the solid electrolyte is activated.

The heater insulating layer 74 is made of insulator such as alumina and formed on upper and lower surfaces of the heater 72. The heater insulating layer 74 is formed to provide electric insulation between the second solid electrolyte layer 2 and the heater 72 and electric insulation between the third solid electrolyte layer 3 and the heater 72.

The pressure diffusion hole 75 is a site penetrating through the third solid electrolyte layer 3 and the fourth solid electrolyte layer 4 and communicated with the reference gas introduction space 40. The pressure diffusion hole 75 is formed to reduce increase in internal pressure along with increase in temperature inside the heater insulating layer 74.

When the concentration of a measurement target gas component included in measurement gas is obtained by using the gas sensor 100A having the above-described configuration, only the predetermined range of the sensor element 101A extending from the distal end E1 and including at least the sensing electrode 10 is disposed in a space in which the measurement gas is present as described above, while the base end E2 side is isolated from the space to supply air (oxygen) into the reference gas introduction space 40. The heater 72 heats the sensor element 101A to an appropriate temperature of 400° C. to 800° C., preferably 500° C. to 700° C., more preferably 500° C. to 600° C. The temperature at which the heater 72 heats the sensor element 101A is also referred to as a sensor drive temperature.

In this state, a potential difference is generated between the sensing electrode 10 exposed to the measurement gas and the reference electrode 20 disposed in the air. However, as described above, the potential of the sensing electrode 10 selectively has concentration dependency on a measurement target gas component in the measurement gas whereas the potential of the reference electrode 20 being disposed in an air (with constant oxygen concentration) atmosphere is maintained constant. Thus, the potential difference (sensor output) substantially has a value in accordance with the composition of the measurement gas present in the surrounding of the sensing electrode 10. Accordingly, a constant functional relation (referred to as a sensitivity characteristic or EMF-to-concentration conversion coefficient information) holds between the concentration of the measurement target gas component and the sensor output. Hereinafter, such a sensitivity characteristic is also referred to as the sensitivity characteristic of the sensing electrode 10.

When actually obtaining the concentration of a measurement target gas component, the sensitivity characteristic is experimentally specified in advance by measuring the sensor output for each measurement gas of a plurality of mutually different mixed gases, in which the concentration of each measurement target gas component is known. Accordingly, when the gas sensor 100A is actually used, the sensor output, which momentarily changes in accordance with the concentration of an measurement target gas component in measurement gas, is converted into the concentration of the measurement target gas component based on the sensitivity characteristic by an arithmetic processing unit (not illustrated). In this manner, the concentration of the measurement target gas component in the measurement gas can be obtained substantially in real time.

<Manufacturing Process of Sensor Element>

The sensor element 101A having the layer structure as illustrated in FIGS. 1A and 1B can be manufactured through manufacturing processes disclosed in, for example, Japanese Patent Application Laid-Open No. 2016-33510 and Japanese Patent No. 5918434.

Generally, the sensor element 101A having the above-described configuration is manufactured as follows. First, predetermined processing, printing of circuit patterns for electrodes, and the like are performed on a plurality of ceramic green sheets containing oxygen-ion conductive solid electrolyte (for example, yttrium partially stabilized zirconia (YSZ)) as a ceramic component and corresponding to the respective solid electrolyte layers. Thereafter, the ceramic green sheets are laminated in a predetermined order, and a laminated body thus obtained is cut into units of elements to obtain a plurality of element bodies. Then, the element bodies are simultaneously fired to achieve integration of each element body, thereby simultaneously manufacturing a plurality of sensor elements 101A.

FIG. 2 is a diagram illustrating the flow of processing of manufacturing the sensor element 101A, which is showed for the purpose of confirmation. When the sensor element 101A is manufactured, first, a blank sheet (not illustrated), which is a green sheet on which no pattern is formed, is prepared (step S1). Specifically, six blank sheets corresponding to the first solid electrolyte layer 1 to the sixth solid electrolyte layer 6 are prepared. Each blank sheet is provided with a plurality of sheet holes used for positioning at printing and laminating. The sheet holes are formed in advance through, for example, punching processing by a punching device. Green sheets corresponding to layers forming an internal space also include penetrating portions corresponding to the internal space in advance through, for example, the punching processing as described above. Not all blank sheets corresponding to the respective layers of the sensor element 101A need to have equal thicknesses.

After the blank sheets corresponding to the respective layers are prepared, pattern printing and dry processing are performed to form various kinds of patterns on each blank sheet (step S2). Specifically, for example, a pattern of each electrode, a pattern of the heater 72, and an internal wire (not illustrated) are formed. In addition, a pattern of the surface protective layer 50 may be printed.

The printing of each pattern is performed by applying, to a blank sheet, pattern formation paste prepared in accordance with a characteristic requested for each formation target by using a well-known screen printing technique. Well-known drying means can be used for the dry processing after the printing.

After the pattern printing is completed, printing of bonding paste and dry processing are performed (step S3). The bonding paste is used to laminate and bond the green sheets corresponding to the respective layers to each other. A well-known screen printing technique can be used for the printing of the bonding paste, and well-known dry means can be used for the dry processing after the printing.

Subsequently, crimping processing is performed (step S4). In the crimping processing, the green sheets to which an adhesive has been applied are stacked in a predetermined order, and the stacked green sheets are crimped under predetermined temperature and pressure conditions to thereby form a laminated body. Specifically, crimping is performed by stacking and holding the green sheets as a target of lamination in a predetermined lamination jig (not illustrated) while positioning the green sheets at the sheet holes, and then heating and pressurizing the green sheets together with the lamination jig using a lamination machine, such as a known hydraulic pressing machine. The pressure, temperature, and time for heating and pressurizing depend on a lamination machine to be used, and these conditions may be set appropriately to achieve good lamination. The surface protective layer 50 may be formed on the laminated body as obtained.

After the laminated body is obtained as described above, the laminated body is cut out at a plurality of positions to obtain a plurality of element bodies (step S5). The cut out element bodies are fired under predetermined conditions, thereby producing the sensor elements 101A as described above (step S6). This means that the sensor element 101A is produced by integral firing (co-firing) of the solid electrolyte layers and the electrodes. The firing temperature is preferably 1,200° C. or higher and 1,500° C. or lower (e.g., 1,400° C.). Integral firing performed in such a manner provides sufficient adhesion strength to each of the electrodes of the sensor element 101A. This contributes to improvement in durability of the sensor element 101A.

The sensor element 101A obtained in this manner is subjected to various kinds of inspection processes such as a characteristic inspection, an appearance inspection, and a strength inspection. Only the sensor element 101A having passed all inspection processes is housed in a predetermined housing and incorporated in a main body (not illustrated) of the gas sensor 100A.

The pattern formation paste (conductive paste) used to form the sensing electrode 10 can be produced by preparing an Au ion-containing liquid as an Au starting material and mixing the Au ion-containing liquid with powdered Pt, powdered zirconia, and a binder. Any binder may be appropriately selected, as long as it can disperse any other raw material to an extent appropriate for printing and is burned out by firing.

The Au ion-containing liquid is obtained by dissolving a salt containing an Au ion or an organometallic complex containing an Au ion in a solvent. The Au ion-containing salt may be, for example, tetrachloroauric(III) acid ($HAuCl_4$), sodium chloroaurate(III) ($NaAuCl_4$), or potassium dicyanoaurate(I) ($KAu(CN)_2$). The Au ion-containing organometallic complex may be, for example, gold(III) diethylenediamine trichloride ($[Au(en)_2]Cl_3$), gold(III) dichloro(1,10-phenanthroline)chloride ($[Au(phen)Cl_2]Cl$), dimethyl (trifluoroacetylacetonate)gold, or dimethyl (hexafluoroacetylacetonate)gold. Tetrachloroauric(III) acid or gold(III) diethylenediamine chloride ($[Au(en)_2]Cl_3$) is preferably used from the viewpoint of no impurity such as Na or K remaining in the electrode, easy handling, or dissolvability in the solvent. The solvent may be acetone, acetonitrile, or formamide as well as alcohols such as methanol, ethanol, and propanol.

Mixing can be performed by well-known means such as instillation. Although the obtained conductive paste contains Au present in ionic (complex ionic) state, the sensing electrode 10 formed in the sensor element 101A obtained through the above-mentioned manufacturing process contain Au mainly as an elemental substrate or an alloy with Pt.

Alternatively, the conductive paste for the sensing electrode 10 may be prepared by using coated powder, which is obtained by coating powdered Pt with Au, as an Au starting raw material, instead of preparing the paste through liquid-state Au mixing as described above. In such a case, a conductive paste for the outer pump electrode is prepared by mixing the coated powder, zirconia powder, and a binder. Here, the coated powder may be obtained by covering the particle surface of powdered Pt with an Au film or applying Au particles to Pt powder particles.

<Relation Between Sensitivity Characteristic and Au Surface Concentration>

As described above, the gas sensor 100A determines a concentration of a measurement target gas component in measurement gas based on the sensitivity characteristic which is a functional relation held between the concentration of the measurement target gas component and the sensor output. However, more specifically, the sensitivity characteristic is different in accordance with the Au maldistribution degree (Au abundance ratio or Au surface concentration) of the sensing electrode 10.

Figure 3:
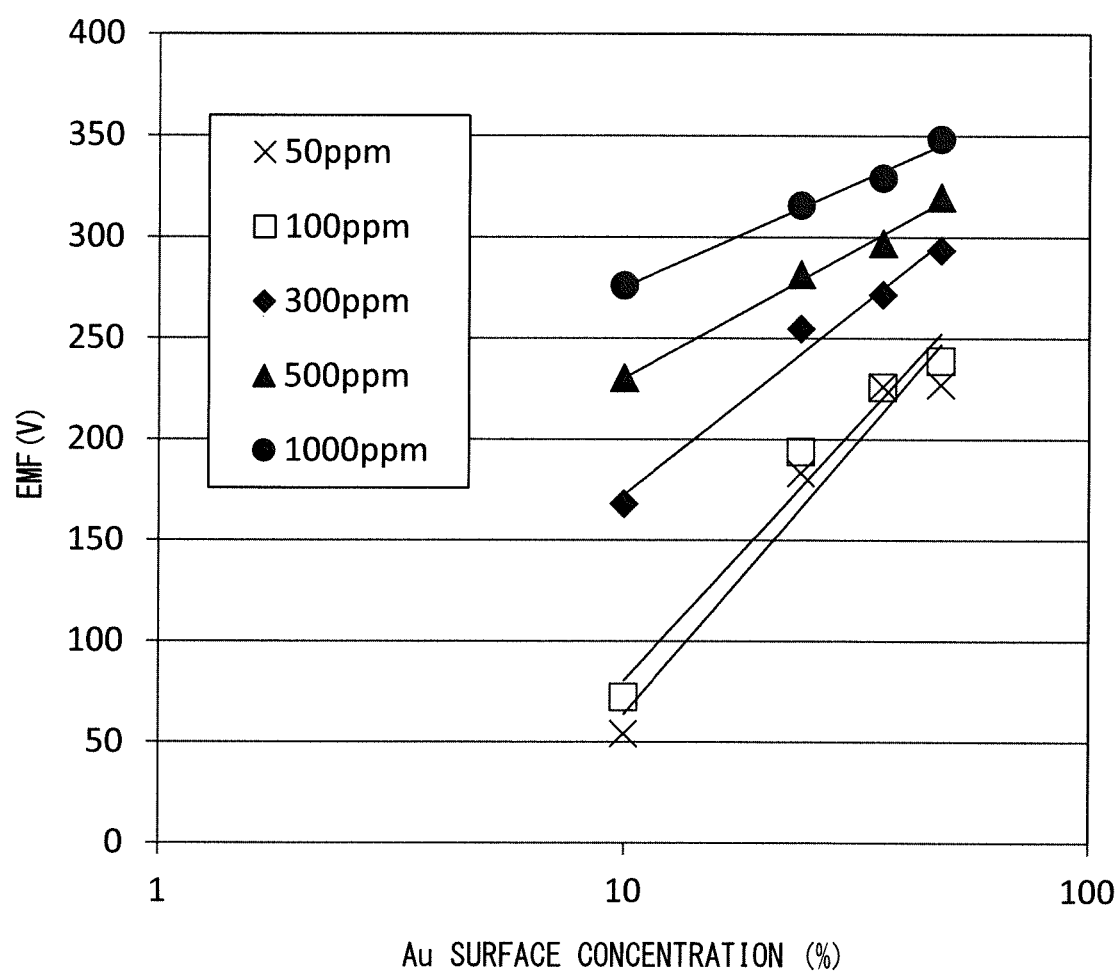
FIG. 3 is a diagram illustrating the relation between a sensor output of measurement of ammonia gas as a measurement target component and an Au surface concentration of a sensing electrode 10 for four kinds of gas sensors 100A (unused specimens)

FIG. 3 is a diagram illustrating, for each of four kinds of gas sensors 100A (unused specimens) having different Au surface concentrations of the sensing electrode 10, the relation between the sensor output (EMF) of measurement of ammonia ($NH_3$) gas as a measurement target component and the Au surface concentration of the sensing electrode 10 in the gas sensor 100A. The Au surface concentration on the horizontal axis is plotted in a logarithmic scale. In the measurement, a model gas device was used, and concentration of the ammonia gas was varied in five levels. The measurement was performed under conditions as follows:

Gas flow rate: 200 L/min;
Gas temperature: 120° C.;
Gas atmosphere: $O_2$=10%, $H_2O$=5%, $NH_3$=50 ppm, 100 ppm, 300 ppm, 500 ppm, or 1000 ppm, $N_2$ being the balance;
Sensor drive temperature: 640° C.

The Au surface concentration of each sensor element 101A was determined based on a result obtained by performing XPS analysis on the sensing electrode 10. To allow the analysis, the surface protective layer 50 of the sensor element 101A was not formed. The four kinds of gas sensors 100A had Au surface concentrations of 10%, 24%, 36%, and 48%, respectively.

FIG. 3 indicates that the sensor output value for the same ammonia gas concentration tends to be larger for a higher Au surface concentration, and the range of the sensor output value tends to be larger in accordance with the ammonia gas concentration for a smaller Au surface concentration.

For example, in the sensor element 101A having an Au surface concentration of 48%, a high sensor output value of approximately 230 mV is obtained when the ammonia gas concentration is 50 ppm. However, the sensor output value only has a difference of 120 mV from the sensor output value of approximately 350 mV obtained when the ammonia gas concentration is 1000 ppm.

In the sensor element 101A having an Au surface concentration of 10%, a small sensor output value of approximately 50 mV is obtained when the ammonia gas concentration is 50 ppm, whereas a value of approximately 280 mV is obtained when the ammonia gas concentration is 1000 ppm. The difference therebetween is 230 mV.

This indicates that the sensitivity characteristic of the sensor element 101A differs in accordance with the Au surface concentration (Au maldistribution degree) of the sensing electrode 10. Specifically, the relation between the ammonia gas concentration and the sensor output in the vertical-axis direction of FIG. 3 at an optional Au surface concentration (Au maldistribution degree) corresponds to the sensitivity characteristic (initial sensitivity characteristic) of the sensor element 101A, in which the sensing electrode 10 has such an Au surface concentration, to the ammonia gas, at least at an initial use stage (at a sensor drive temperature of 640° C.). At actual manufacturing (mass production) of the sensor element 101A, the Au maldistribution degree of the sensing electrode 10, in which a desired initial sensitivity characteristic can be obtained, is specified in advance, and conditions of manufacturing the sensor element 101A are determined so that such a sensing electrode 10 is formed.

FIG. 3 also illustrates approximate straight lines calculated by least square approximation with the Au surface concentration as x and the "sensor output" as y for the same ammonia gas concentration in model gas. The function of each approximate straight line and a determination coefficient $R^2$ as the squared value of a correlation coefficient R are shown below.

50 ppm: $y=116.66 \ln(x)-204.70$, $R^2=0.9524$;
100 ppm: $y=109.52 \ln(x)-171.65$, $R^2=0.9665$;
300 ppm: $y=79.44 \ln(x)-10.03$, $R^2=0.9780$;
500 ppm: $y=55.27 \ln(x)+103.28$, $R^2=0.9925$;
1000 ppm: $y=44.57 \ln(x)+172.94$, $R^2=0.9922$.

As understood from FIG. 3 and the above-described values of the determination coefficient $R^2$, a linear relation (strong positive correlation) holds between the sensor output and the Au surface concentration for any concentration value.

<Alternative Evaluation of Au Maldistribution Degree by Reaction Resistance and Calibration of Sensitivity Characteristic>

As described above, the gas sensor 100A is used after the sensitivity characteristic of the gas sensor 100A is specified in advance so as to suit the Au maldistribution degree at the sensing electrode 10. In this case, the Au maldistribution degree needs to be evaluated directly based on an Au abundance ratio or an Au surface concentration calculated based on an analysis result obtained by surface composition analysis such as XPS or AES analysis. However, it is not realistic to apply such a method to calculate the Au maldistribution degree at the sensing electrode 10 provided to a mass-produced sensor element 101A. This is because the sensing electrode 10 needs to be exposed by removing the surface protective layer 50 or breaking the sensor element 101A to determine the Au abundance ratio or the Au surface concentration at the sensing electrode 10 of the sensor element 101A including the surface protective layer 50, and as a matter of course, it is impossible to use the sensor element 101A again after the evaluation. The evaluation can be performed in a non-destructive manner only in a limited case in which the sensor element 101A includes no surface protective layer 50.

Thus, the sensitivity characteristic of a mass-produced sensor element 101A can be only specified based on an assumption that the mass-produced sensor element 101A has an Au maldistribution degree same as that of a sensor element 101A (hereinafter also referred to as a standard sensor element) which is manufactured under the same condition and in which the Au maldistribution degree of the sensing electrode 10 is known (in other words, the Au abundance ratio or the Au surface concentration is already calculated based on an analysis result obtained by XPS or AES analysis).

The gas sensor 100A according to the present preferred embodiment is used while the sensing electrode 10 is disposed in contact with the atmosphere of measurement gas and the sensor element 101A is heated to a predetermined sensor drive temperature by the heater 72.

As a result of intensive studies, the inventor of the present application invention have found that, when the gas sensor 100A is continuously used in such a state for a long term, the Au maldistribution degree at the sensing electrode 10 decreases due to progress of Au evaporation from the sensing electrode 10, which causes decrease of the sensor output in some cases. This is thought to be because the state of continuous use of the gas sensor 100A for a long term is a state in which the sensor element 101A is continuously heated at the sensor drive temperature for a long time, and Au, which has a melting point relatively close to the sensor element drive temperature, is likely to evaporate in such a state.

If the Au maldistribution degree at the sensing electrode 10 significantly decreases due to progress of such Au evaporation, a sensitivity characteristic specified at the start of use no longer corresponds to the actual Au maldistribution degree at the sensing electrode 10, and thus the concentration of a measurement target gas component may not be correctly obtained. Specifically, the concentration value of the measurement target gas component obtained by using the gas sensor 100A in which the Au maldistribution degree has decreased is smaller than the true value.

In order to continuously use the gas sensor 100A while maintaining the accuracy of measurement even when the Au maldistribution degree has decreased as above, the sensitivity characteristic needs to be calibrated in accordance with the actual Au maldistribution degree.

However, XPS or AES analysis of the sensor element 101A of the gas sensor 100A in use is unrealistic even if the sensor element 101A includes no surface protective layer 50.

Thus, in the present preferred embodiment, a physical property value that is correlated with an Au abundance ratio or an Au surface concentration obtained based on a result of XPS measurement or AES measurement and can be acquired (in a non-destructive manner as a matter of course) while maintaining the state of the gas sensor 100A in use is adopted as an alternative evaluation index (alternative maldistribution degree index) of the Au maldistribution degree. In this manner, the Au maldistribution degree of the sensor element 101A in actual use can be evaluated in a non-destructive manner while the sensor element 101A is continuously used. Furthermore, the sensitivity characteristic of the gas sensor 100A can be calibrated by using such an evaluation index. Specifically, the evaluation is performed in two aspects exemplarily described below with different physical property values actually used as the alternative maldistribution degree index.

(First Aspect: Evaluation Based on Reaction Resistance)

In the present aspect, reaction resistance (electrode reaction resistance) between the sensing electrode 10 and the reference electrode 20, which is correlated with the Au abundance ratio or the Au surface concentration is used as the alternative maldistribution degree index in the manufacturing process (mass production process) of the sensor element 101A. Hereinafter, the reaction resistance between the sensing electrode 10 and the reference electrode 20 of the sensor element 101A is also simply referred to as the reaction resistance of the sensor element 101A. The reaction resistance is used as a determination index for necessity of recovery processing in Japanese Patent Application Laid-Open No. 2017-110967.

(Derivation of Reaction Resistance)

The reaction resistance of the sensor element 101A is obtained from plotting of a result of two-terminal complex impedance measurement in a Nyquist diagram having the real axis (Z' axis in units of Ω) as the horizontal axis and the imaginary axis (Z" axis in units of Ω) as the vertical axis. The two-terminal complex impedance measurement is performed by applying alternating-current voltage at different frequencies between the sensing electrode 10 and the reference electrode 20. Even when the sensor element 101A has been incorporated in the gas sensor 100A, such complex impedance measurement could be performed by using a lead line connected with each electrode in the gas sensor 100A. Thus, this complex impedance measurement can be performed on the sensor element 101A and hence the gas sensor 100A in a non-destructive manner, even when the gas sensor 100A is used and attached to a predetermined attachment position.

FIGS. 4A to 4D are schematic Nyquist diagrams for description of derivation of the reaction resistance of the sensor element 101A.

Figure 4A:
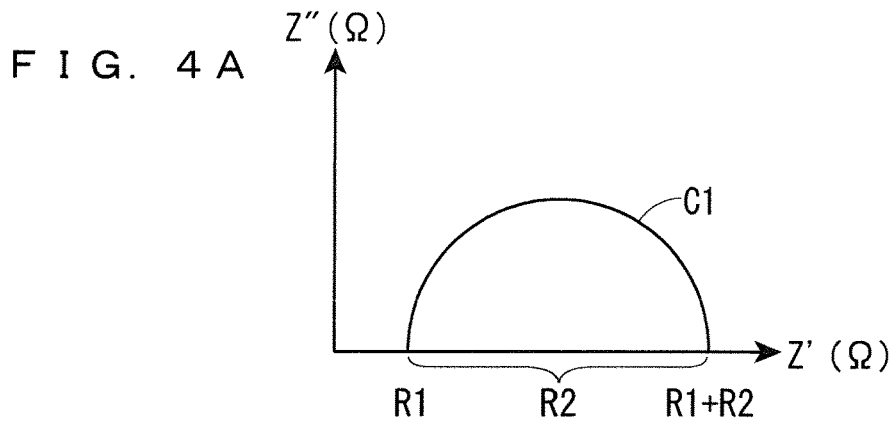
FIGS. 4A, 4B, 4C, and 4D are schematic Nyquist diagrams for description of derivation of the reaction resistance of the sensor element 101A.
Figure 4B:
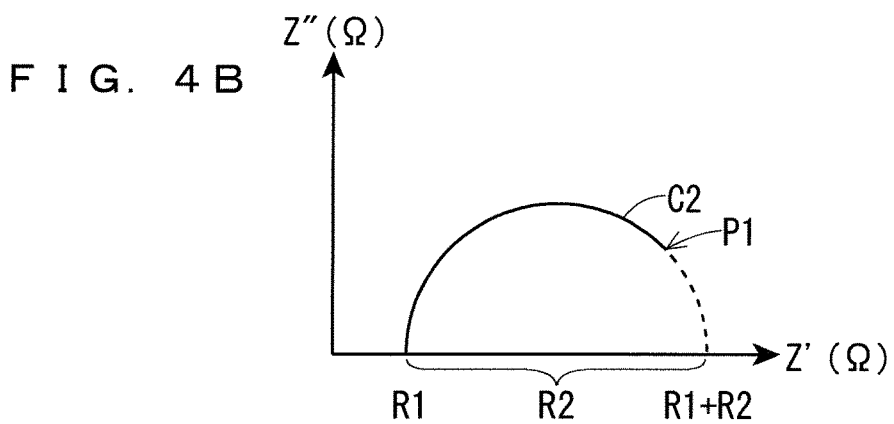
Figure 4C:
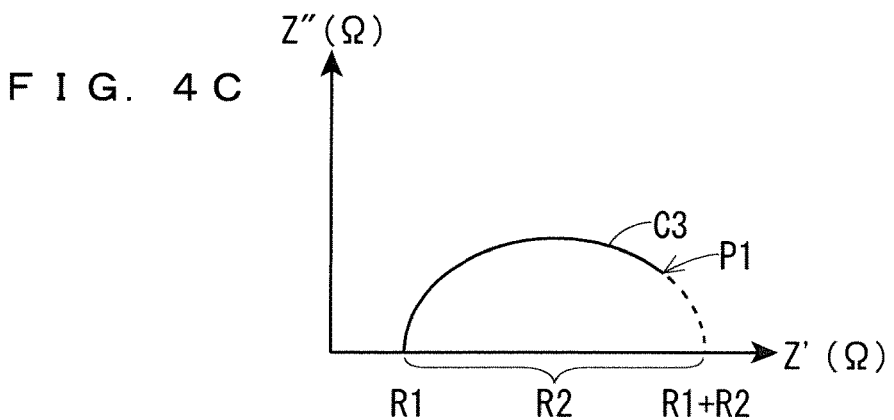

Plotting of measured data obtained by the two-terminal complex impedance measurement described above ideally obtains a semicircular curved line C1 starting at a point (Z', Z")=(R1, 0) on the real axis as illustrated in FIG. 4A. When the Z' coordinate value of an end point opposite to (Z', Z")=(R1, 0) on the curved line C1 is expressed as R1+R2, the reaction resistance is an increased value R2 of the Z' coordinate value from R1. The value R1 is an IR resistance (insulation resistance), and corresponds to, for example, the material resistance of a solid electrolyte forming a sensor element in a mixed-potential gas sensor such as the gas sensor 100A. Thus, the value of R1, not R2, varies when anomaly occurs in the solid electrolyte.

However, the plotting of measured data of the two-terminal complex impedance measurement does not necessarily draw a semicircle like the curved line C1 illustrated in FIG. 4A. For example, a result of the plotting obtains a semicircular curved line C2 illustrated in FIG. 4B, which starts at an end point (Z', Z")=(R1, 0) while the other end point does not reach the real axis Z' but ends at a halfway point P1, or another result of the plotting obtains a curved line C3 illustrated in FIG. 4C, which is not in a semicircular shape but in an arc shape ending at the halfway point P1.

In these cases, the reaction resistance R2 can be determined by using the Z' coordinate value of a point of extrapolation from the point P1 to the real axis Z'.

Figure 4D:
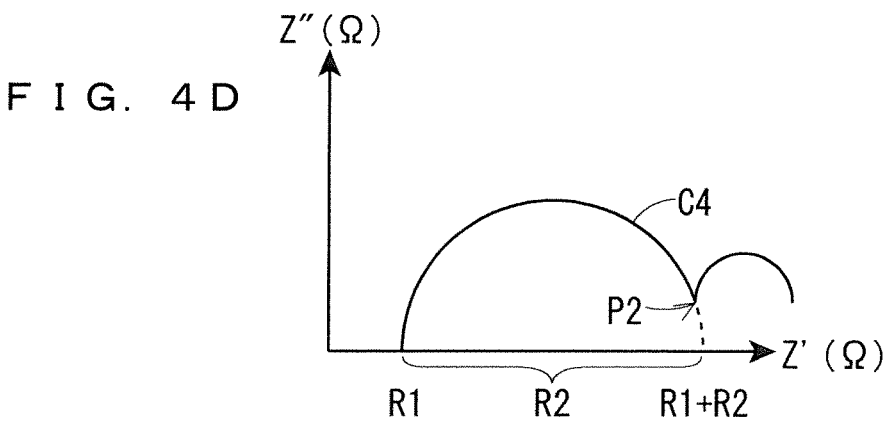

Another result of the plotting obtains two arcs connected with each other at a point P2 like a curved line C4 illustrated in FIG. 4D. In such a case, the arc formed in a range in which the Z' axis coordinate value is larger than that of the point P2 is reflected on diffusion resistance in the sensor element 101A. The reaction resistance can be obtained by extrapolation of the point P2, similarly to the cases in FIGS. 4B and 4C.

(Application to Unused Specimens)

Figure 5:
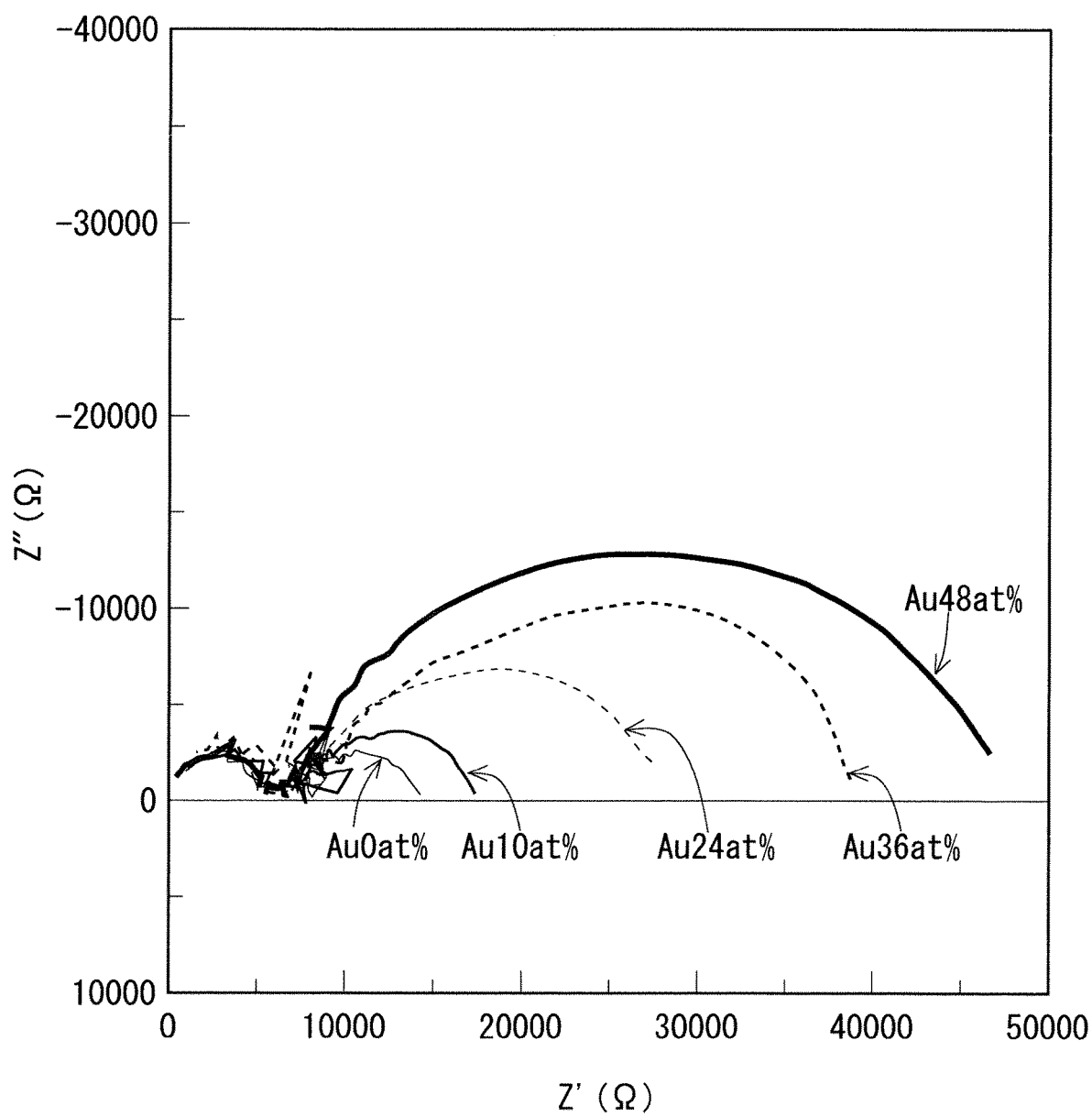
FIG. 5 is a Nyquist diagram illustrating a result of two-terminal complex impedance measurement performed at a sensor drive temperature of 640° C. to obtain the reaction resistances of the five sensor elements 101A having different Au maldistribution degrees at the sensing electrode 10.
Figure 6:
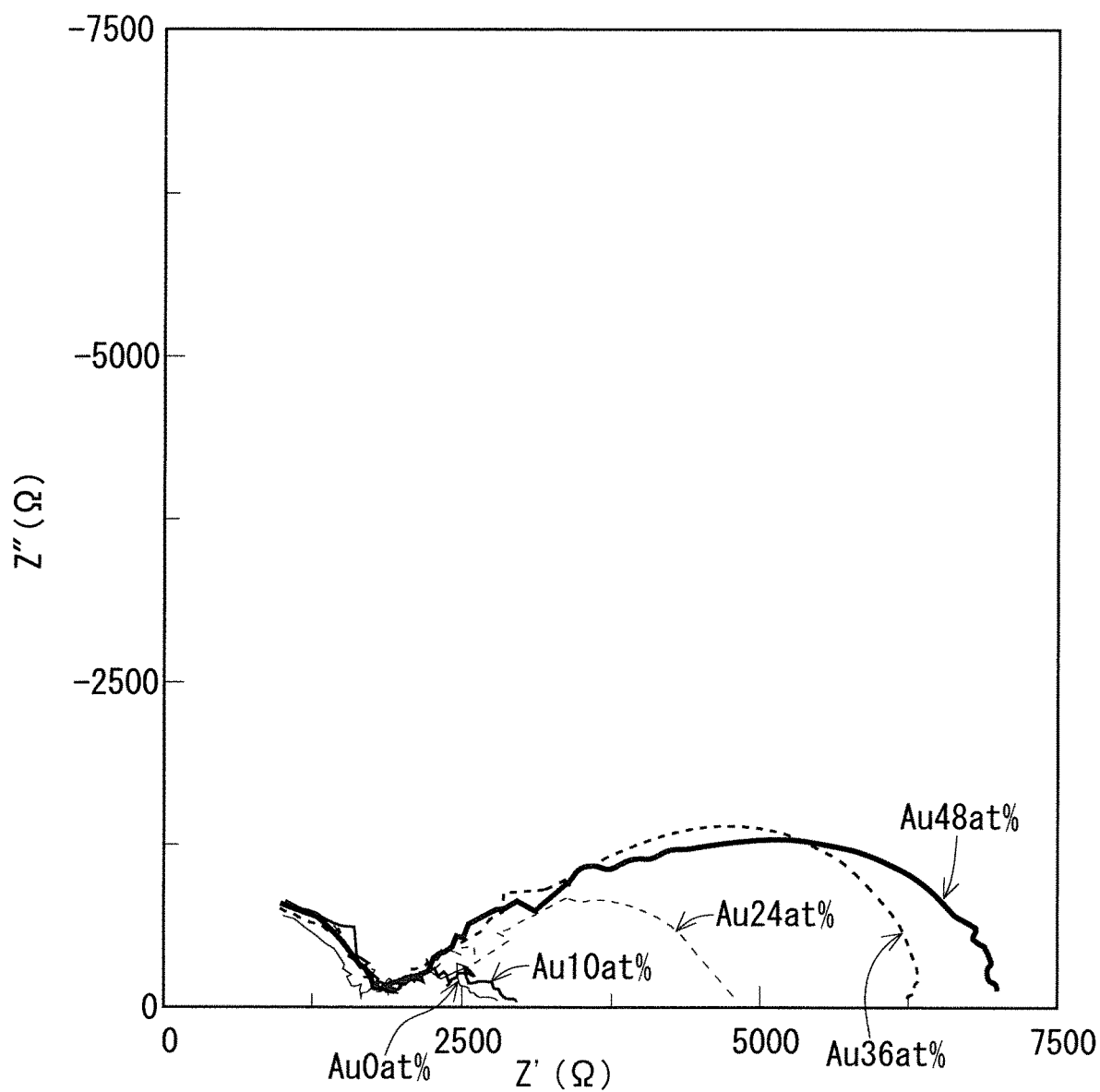
FIG. 6 is a Nyquist diagram illustrating a result of two-terminal complex impedance measurement performed at a sensor drive temperature of 750° C. to obtain the reaction resistances of the five sensor elements 101A having different Au maldistribution degrees at the sensing electrode 10.
Figure 7:
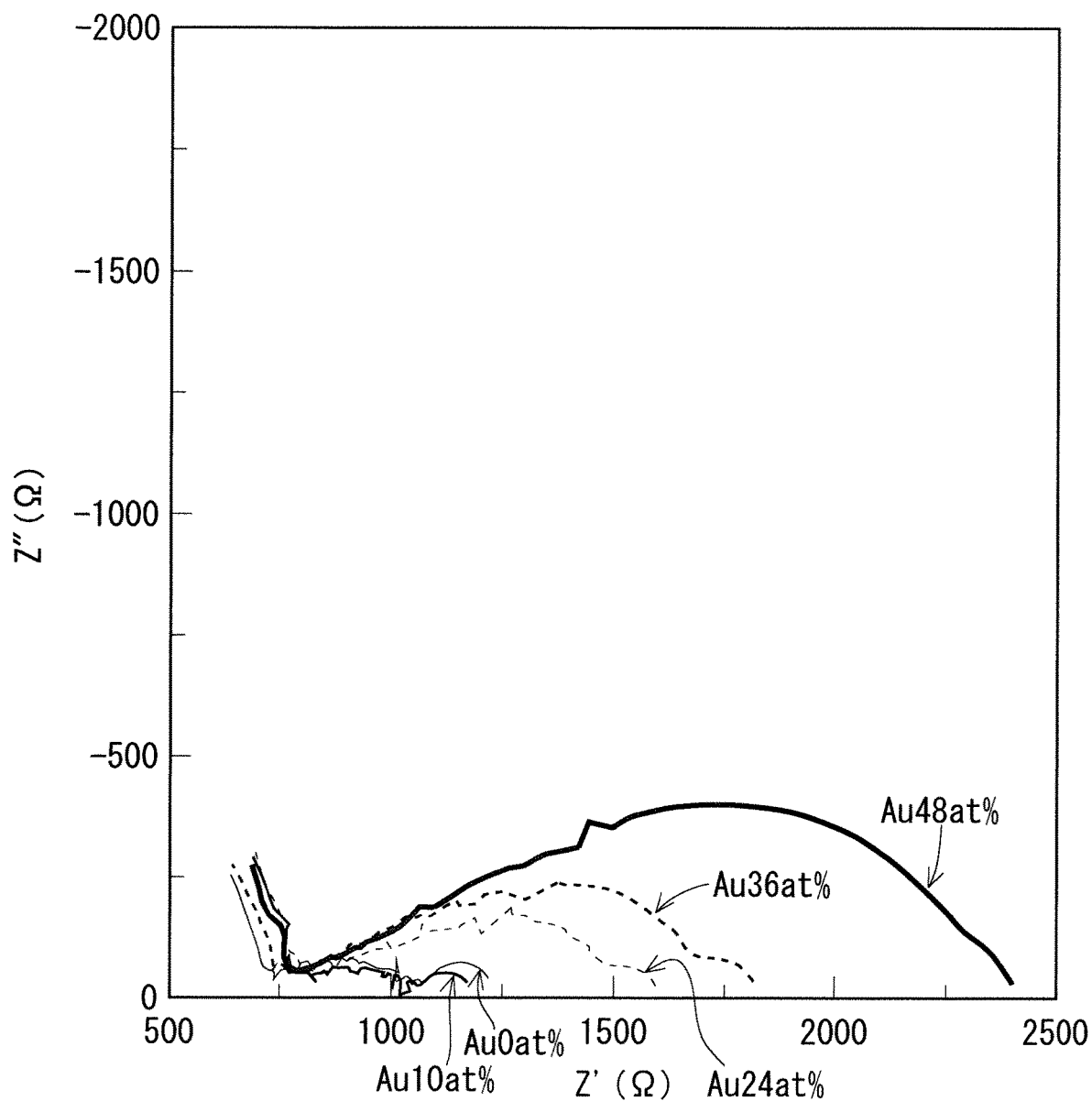
FIG. 7 is a Nyquist diagram illustrating a result of two-terminal complex impedance measurement performed at a sensor drive temperature of 850° C. to obtain the reaction resistances of the five sensor elements 101A having different Au maldistribution degrees at the sensing electrode 10.

FIGS. 5, 6, and 7 are Nyquist diagrams (Cole-Cole plots) illustrating results of the two-terminal complex impedance measurement performed to obtain the reaction resistance for five sensor elements 101A (unused specimens) having different Au maldistribution degrees at the sensing electrode 10. Four of the five sensor elements are those used in the above-described evaluation of the relation between the ammonia gas concentration and the sensor output (EMF) and thus have Au surface concentrations of 10%, 24%, 36%, and 48%, respectively, of the sensing electrode 10. The remaining one is a sensor element having an Au surface concentration of 0% of the sensing electrode 10 where Pt is the only noble metal component of the sensing electrode 10. The formation of the surface protective layer 50 is also omitted for these sensor elements 101A.

More specifically, the sensor drive temperature was set to three different levels of 640° C., 750° C., and 850° C. FIGS. 5, 6, and 7 illustrate results obtained when the sensor drive temperature was 640° C., 750° C., and 850° C., respectively. The complex impedance measurement was performed under air atmosphere by using a complex impedance measurement device Versa STAT 4 (manufactured by AMETEK Inc.), while the sensing electrode 10 was connected to a WE/SE line and the reference electrode 20 was connected to a CE/RE line. The frequency of alternating-current voltage was 1 MHz to 0.1 Hz, DC bias voltage was 0 V, and alternating-current amplitude was 20 mV.

Figure 8:
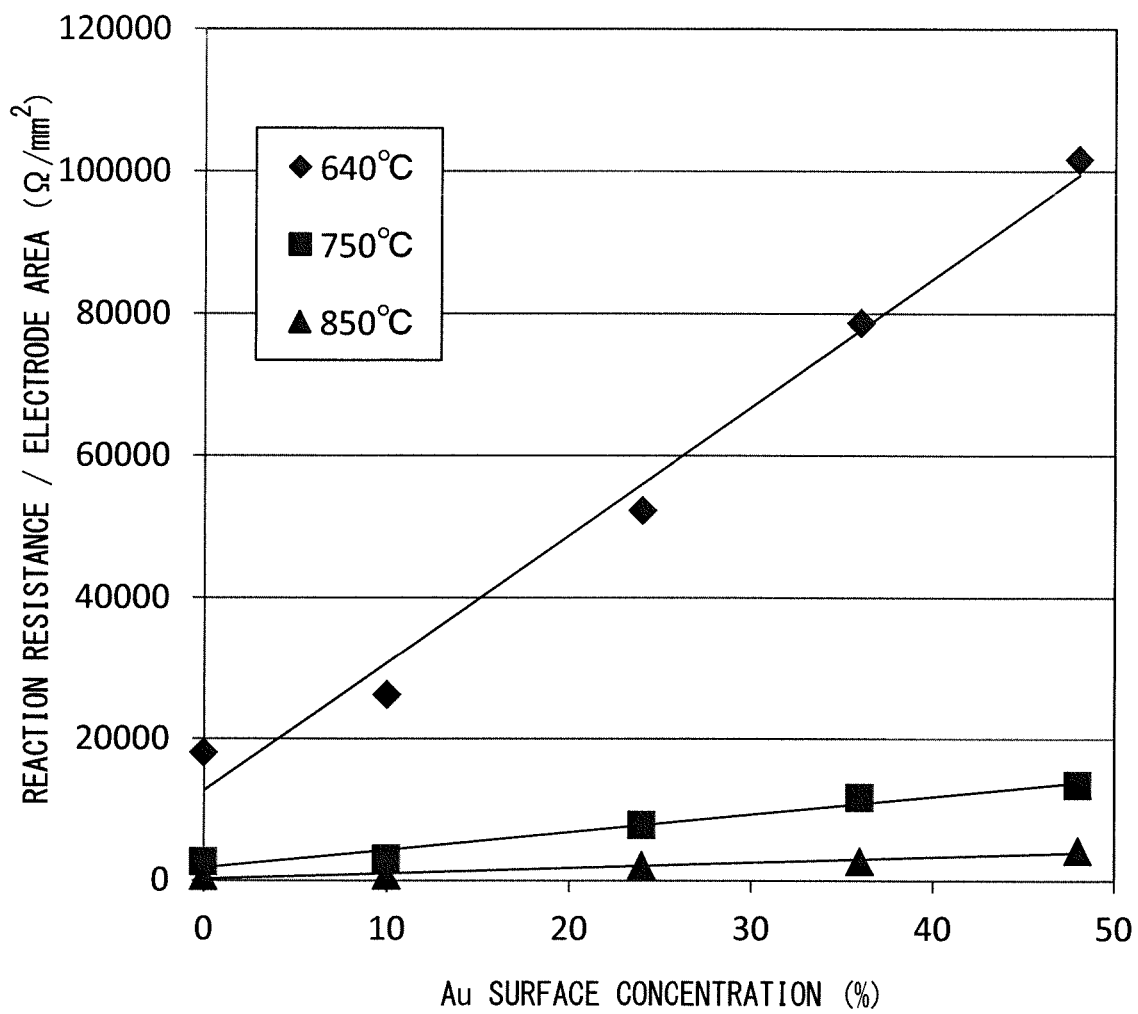
FIG. 8 is a diagram plotting a reaction resistance value per unit area of the sensing electrode 10 against an Au surface concentration.

FIG. 8 is a diagram plotting, for each sensor drive temperature, the value of "reaction resistance/electrode area" (in units of $\Omega/mm^2$), which is a reaction resistance value per unit area of the sensing electrode 10, against the Au surface concentration. The value of "reaction resistance/electrode area" can be obtained by normalizing the values of the reaction resistance obtained from FIGS. 5, 6, and 7 with the area of the sensing electrode.

FIG. 8 also illustrates, for the plotting result at each sensor drive temperature, an approximate straight line calculated by least square approximation when the Au surface concentration is taken to be x and the "reaction resistance/electrode area" is taken to be y. The function of each approximate straight line and a determination coefficient $R^2$ as the squared value of a correlation coefficient R are shown below. The area of the sensing electrode 10 is 0.4 $mm^2$.

640° C.: y=1806.3x+17729, $R^2$=0.9859;
750° C.: y=250.69x+1803, $R^2$=0.9684;
850° C.: y=77.271x+218.5, $R^2$=0.9522.

As understood from FIG. 8 and the above-described values of the determination coefficient $R^2$, the (normalized) reaction resistance and the Au surface concentration have a linear relation (strong positive correlation) therebetween in any of the cases of 640° C., 750° C., and 850° C. The same result can be obtained at any other sensor drive temperature at least in the temperature range of 640° C. to 850° C.

Such a correlation means that the reaction resistance can be used as an alternative index of the Au maldistribution degree at the sensing electrode 10 at least for the unused gas sensor 100A (or gas sensor 100A at an initial use stage). Specifically, a standard or condition of the gas sensor 100A defined based on the Au maldistribution degree can be redefined based on the reaction resistance through the correlation.

Practically, the correlation between the reaction resistance and the Au surface concentration or the Au abundance ratio as illustrated in FIG. 8 may be specified as follows. First, a plurality of sensor elements 101A that satisfy the same manufacturing condition except for the Au maldistribution degree of the sensing electrode 10 are produced. Then, complex impedance measurement is performed at a predetermined sensor drive temperature selected from the range of, for example, 640° C. to 850° C. to measure the reaction resistance of each sensor element 101A. Thereafter, XPS measurement or AES measurement is performed to determine the Au surface concentration or the Au abundance ratio. When the surface protective layer 50 is provided, the sensing electrode 10 may be exposed by peeling the surface protective layer 50 or breaking the element before the XPS or AES measurement.

FIG. 9 is a diagram obtained by redrawing, based on the correlation illustrated in FIG. 8, the relation between the sensor output (EMF) and the Au surface concentration illustrated in FIG. 3 with the value of "reaction resistance/ electrode area" as the horizontal axis in place of the Au surface concentration. The value of "reaction resistance/ electrode area" on the horizontal axis is plotted in a logarithmic scale.

FIG. 9 is nothing less than an illustration of the initial sensitivity characteristic of the gas sensor 100A based on the reaction resistance. Specifically, the relation between the ammonia gas concentration and the sensor output in the vertical-axis direction of FIG. 9 at an optional reaction resistance corresponds to the initial sensitivity characteristic of the sensor element 101A, the sensing electrode 10 of which having this reaction resistance, to the ammonia gas (at a sensor drive temperature of 640° C.). In manufacturing of the sensor element 101A, conditions of manufacturing the sensing electrode 10 may be determined, based on the relation between the ammonia gas concentration and the sensor output (EMF) as illustrated in FIG. 9, so that the sensing electrode 10 having a reaction resistance that leads to an intended initial sensitivity characteristic is formed.

Similarly to FIG. 3, FIG. 9 also illustrates approximate straight lines calculated by least square approximation with the value of "reaction resistance/electrode area" as x and the "sensor output" as y for the same ammonia gas concentration in model gas. The function of each approximate straight line and a determination coefficient $R^2$ as the squared value of a correlation coefficient R are shown below.

50 ppm: y=133.4 ln(x)−1289.0, $R^2$=0.9328;
100 ppm: y=125.2 ln(x)−1189.3, $R^2$=0.9464;
300 ppm: y=90.87 ln(x)−749.05, $R^2$=0.9592;
500 ppm: y=63.62 ln(x)−415.28, $R^2$=0.9857;
1000 ppm: y=51.38 ln(x)−246.02, $R^2$=0.9884.

As understood from FIG. 9 and the above-described values of the determination coefficient $R^2$, a linear relation (strong positive correlation) holds between the sensor output and the value of "reaction resistance/electrode area" for any concentration value.

(Application to Long-Term Continuously Used Specimens)

The following describes that the reaction resistance can be used as the alternative index (alternative maldistribution degree index) of the Au maldistribution degree in the gas sensor 100A in which Au evaporation has progressed due to long-term continuous use.

The following description will be made on an exemplary case in which the gas sensor 100A is an ammonia sensor that is attached to an exhaust path of a diesel engine and the measurement target gas component of which is ammonia gas, the sensor drive temperature is 640° C., and the Au surface concentration of the sensing electrode 10 is 48% when unused (at an initial use stage).

For discussion, Samples A and B were prepared. Samples A and B are two unused gas sensors 100A fabricated such that the Au surface concentration of the sensing electrode 10 is 48% (more specifically, the main bodies thereof), and left to stand for 2000 hours in an electric furnace in which air atmosphere is maintained at 700° C. to reproduce conditions after long-term use. Measurement of the reaction resistance and evaluation of the sensitivity characteristic to ammonia ($NH_3$) gas as a measurement target component were performed on Samples A and B. After the evaluation, each gas sensor 100A was disassembled to take out the sensor element 101A, and then XPS measurement was performed on the sensing electrode 10 to determine the Au surface concentration at the sensing electrode 10 based on as a result of the measurement.

Leaving the gas sensor 100A (ammonia sensor) to stand in air atmosphere at 700° C. for 2000 hours corresponds to conditions of an acceleration durability test at a sensor drive temperature of 640° C. This is because the gas sensor 100A (ammonia sensor) is exposed to atmosphere at 700° C. or higher almost only in DPF regeneration, and is not continuously exposed to atmosphere at 700° C. or higher for 2000 hours.

The use of an accelerated test specimen instead of a gas sensor actually continuously used for a long term reliably excludes the influence of decrease of the reaction resistance caused by adhesion of a gas component included in measurement gas to the sensing electrode 10 as described later.

Figure 10:
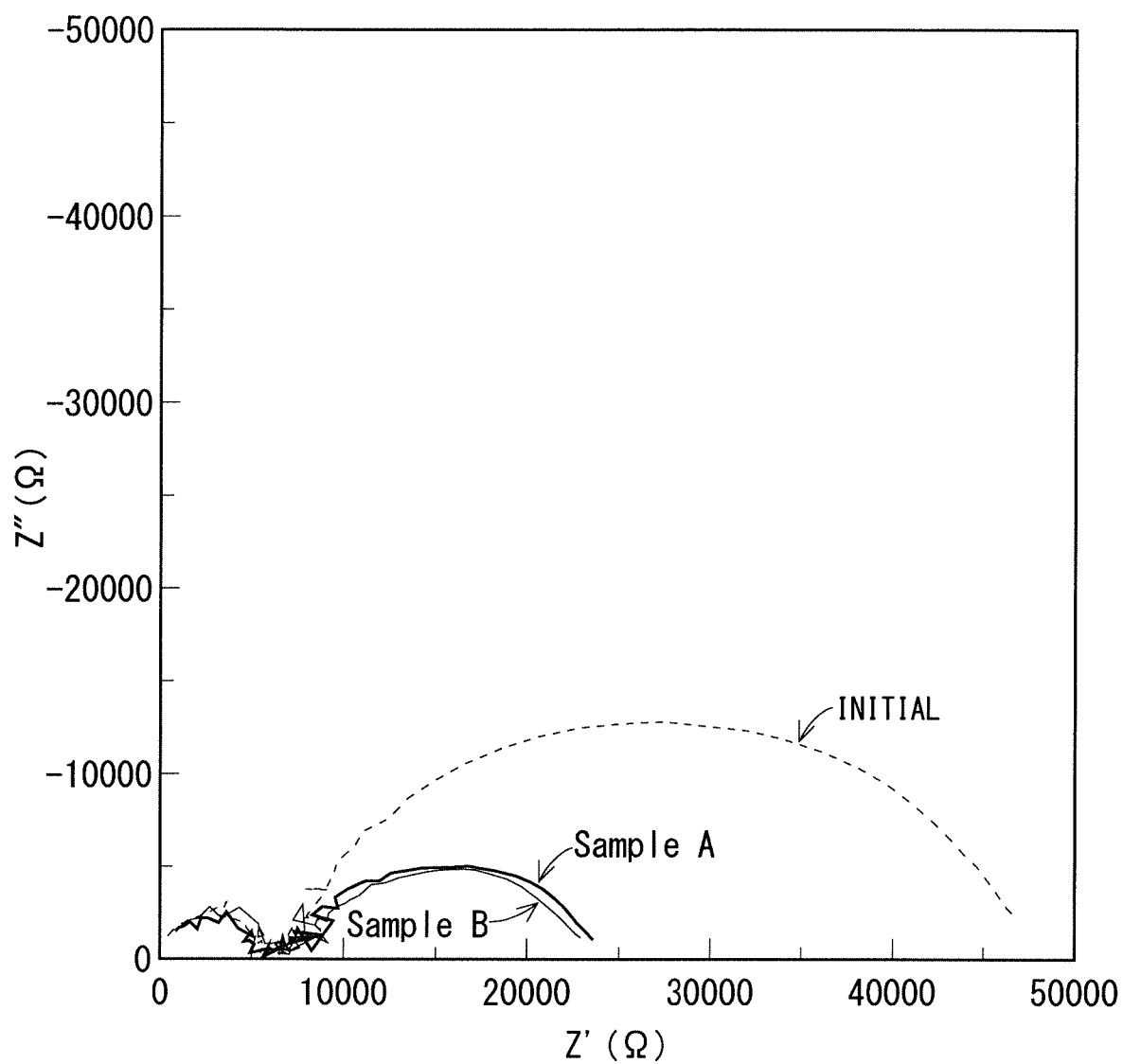
FIG. 10 is a Nyquist diagram illustrating results of two-terminal complex impedance measurement performed to determine the reaction resistances of Samples A and B.

FIG. 10 is a Nyquist diagram (Cole-Cole plot) illustrating results of two-terminal complex impedance measurement performed to obtain the reaction resistances of Samples A and B. The complex impedance measurement was performed under air atmosphere by using a complex impedance measurement device Versa STAT 4 (manufactured by AMETEK Inc.), while the sensing electrode 10 was connected to a WE/SE line and the reference electrode 20 was connected to a CE/RE line. The frequency of alternating-current voltage was 1 MHz to 0.1 Hz, DC bias voltage was 0 V, and alternating-current amplitude was 20 mV. For comparison, FIG. 10 illustrates, with a dashed line, the result of complex impedance measurement on the sensor element 101A as an unused specimen in which the Au surface concentration of the sensing electrode 10 is 48% as illustrated in FIG. 5. Hereinafter, such an unused specimen is also referred to as an "initial" specimen.

FIG. 10 indicates that the reaction resistances of Samples A and B are significantly smaller than that of the initial specimen.

Table 1 lists, for each of Samples A and B and the initial specimen, the reaction resistance (in units of Ω) at a sensor drive temperature of 640° C. obtained based on a Nyquist diagram and the Au surface concentration (in units of %) calculated based on an XPS measurement result.

TABLE 1

| | Reaction resistance (Ω) | Au surface concentration (%) |
|---|---|---|
| Sample A | 20879 | 23 |
| Sample B | 16666 | 18 |
| Initial specimen | 40653 | 48 |

As indicated in Table 1, the reaction resistance and the Au surface concentration of each of Samples A and B are smaller than those of the initial specimen. This indicates that the Au maldistribution degree decreased due to long-term continuous use, and accordingly, the reaction resistance decreased as well.

Similarly to FIG. 8, FIG. 11 illustrates a plot of the value of "reaction resistance/electrode area" (in units of $\Omega/mm^2$) as reaction resistance value per unit area of the sensing electrode 10, which is obtained by normalizing the values of the reaction resistances of Samples A and B with the area of the sensing electrode, against the Au surface concentration. As described above, the area of the sensing electrode 10 is 0.4 mm². FIG. 11 also illustrates an approximate straight line (first initial specimen approximate straight line) obtained from the plot result illustrated in FIG. 8 for an unused specimen (initial specimen) at a sensor drive temperature of 640° C.

As understood from FIG. 11, the coordinate positions of Samples A and B are substantially on the first initial specimen approximate straight line. This suggests that when the gas sensor 100A is continuously used for a long term at a predetermined sensor drive temperature, degradation of the gas sensor 100A (decrease of the Au surface concentration and the reaction resistance) due to progress of Au evaporation from the sensing electrode 10 occurs along the correlation between the Au surface concentration and the reaction resistance at the sensor drive temperature for an unused specimen (initial specimen), which is expressed by the first initial specimen approximate straight line.

Specifically, Samples A and B each correspond to the gas sensor 100A that has met a range (the Au surface concentration is approximately 48% and the reaction resistance is approximately 100000Ω) illustrated as a region RE0 in FIG. 11 as long as it is an unused specimen, but has degraded over use.

In FIG. 11, the coordinate positions of a long-term continuously used specimen for the reaction resistance and the Au surface concentration are along the first initial specimen approximate straight line. This indicates that the relation represented by the first initial specimen approximate straight line between the reaction resistance and the Au surface concentration can be directly applied to a long-term continuously used specimen. Accordingly, for the gas sensor 100A, irrespective of whether it is an unused specimen or a long-term continuously used specimen, the reaction resistance can be used as an index (alternative maldistribution degree index) of the Au maldistribution degree, in place of the Au surface concentration (or the Au abundance ratio), based on the first initial specimen approximate straight line.

For example, once the first initial specimen approximate straight line as illustrated in FIG. 11 or 8 is specified for an unused specimen in advance, the reaction resistance only needs to be measured at an appropriate timing for any gas sensor 100A fabricated under an identical condition, while the gas sensor 100A is in use, for allowing to evaluate the Au surface concentration or the Au abundance ratio of the sensing electrode 10 based on the measured value and the first initial specimen approximate straight line. Furthermore, the degree of degradation (the degree of Au evaporation) of the sensing electrode 10 can be determined from the magnitude of a difference value from an initial value.

(Calibration of Sensitivity Characteristic)

FIG. 12 is a diagram illustrating the relation between the sensor output (EMF) of measurement of ammonia ($NH_3$) gas as a measurement target component and the Au surface concentration of the sensing electrode 10 for Samples A and B. The Au surface concentration on the horizontal axis is plotted in a logarithmic scale. Measurement conditions are same as those at acquisition of the result illustrated in FIG. 3. Specifically, the concentration of the ammonia gas was set to be five values of 50 ppm, 100 ppm, 300 ppm, 500 ppm, and 1000 ppm. Samples A and B had Au surface concentrations as shown in Table 1.

Although not explicitly illustrated in FIG. 12 for simplicity of illustration, the sensor output was smaller for a smaller ammonia gas concentration for Samples A and B. For example, the lowest data point in the vertical-axis direction indicates a sensor output value when the ammonia gas concentration is 50 ppm, and the highest data point indicates a sensor output value when the ammonia gas concentration is 1000 ppm.

FIG. 12 also illustrates the approximate straight line illustrated in FIG. 3 for an unused specimen (initial specimen) and representing the relation between the Au surface concentration and the sensor output for the same ammonia gas concentration in model gas.

In FIG. 12, data points of the sensor output value corresponding to each of the above-described five ammonia gas concentrations for Samples A and B are positioned along an approximate straight line for the ammonia gas concentration in an unused specimen (initial specimen).

This indicates that the sensitivity characteristic (initial sensitivity characteristic), which had been specified as the relation between the sensor output value and the ammonia gas concentration at a position indicated as "initial" in FIG. 12 for an initial specimen (at manufacturing), changes through Au evaporation from the surface of the sensing electrode 10 due to continuous use of the gas sensor 100A. Furthermore, it is indicated that, in principle, the change of the sensitivity characteristic may be grasped as change along the relation between the Au surface concentration of the sensing electrode 10 and the sensor output for an unused specimen (initial specimen) (more specifically, as change along with decrease of the Au surface concentration).

However, it is impossible to measure the Au surface concentration of the gas sensor 100A in use. FIG. 13 illustrates, based on the correlations illustrated in FIGS. 8 and 11, the relation between the sensor output (EMF) and the Au surface concentration for Samples A and B, which has been illustrated in FIG. 12, with the value of "reaction resistance/electrode area" as the horizontal axis in place of the Au surface concentration, in the context of allowing the reaction resistance to be applied as an alternative maldistribution degree index. The value of "reaction resistance/electrode area" on the horizontal axis is plotted in a logarithmic scale. Similarly to FIG. 12, FIG. 13 also illustrates the approximate straight line illustrated in FIG. 9 for an unused specimen (initial specimen) and representing the relation between the value of "reaction resistance/electrode area" and the sensor output for the same ammonia gas concentration in model gas. In FIG. 13, as a matter of course, the sensor output is smaller for a smaller ammonia gas concentration for Samples A and B as in FIG. 12.

FIG. 13 indicates that change of the sensitivity characteristic from the initial sensitivity characteristic due to continuous use of the gas sensor 100A is grasped as decrease of the reaction resistance (or the value of "reaction resistance/electrode area"). Unlike the Au surface concentration, the reaction resistance can be measured for the gas sensor 100A in use (attached to a predetermined use position). Thus, if the reaction resistance is measured at an appropriate timing for the continuously used gas sensor 100A, then the presence or absence of change of the sensitivity characteristic from an initial use stage (in other words, the presence or absence of Au evaporation from the sensing electrode 10, affecting the sensitivity characteristic) at the timing of the measurement is determined from the measured value.

Figure 14:
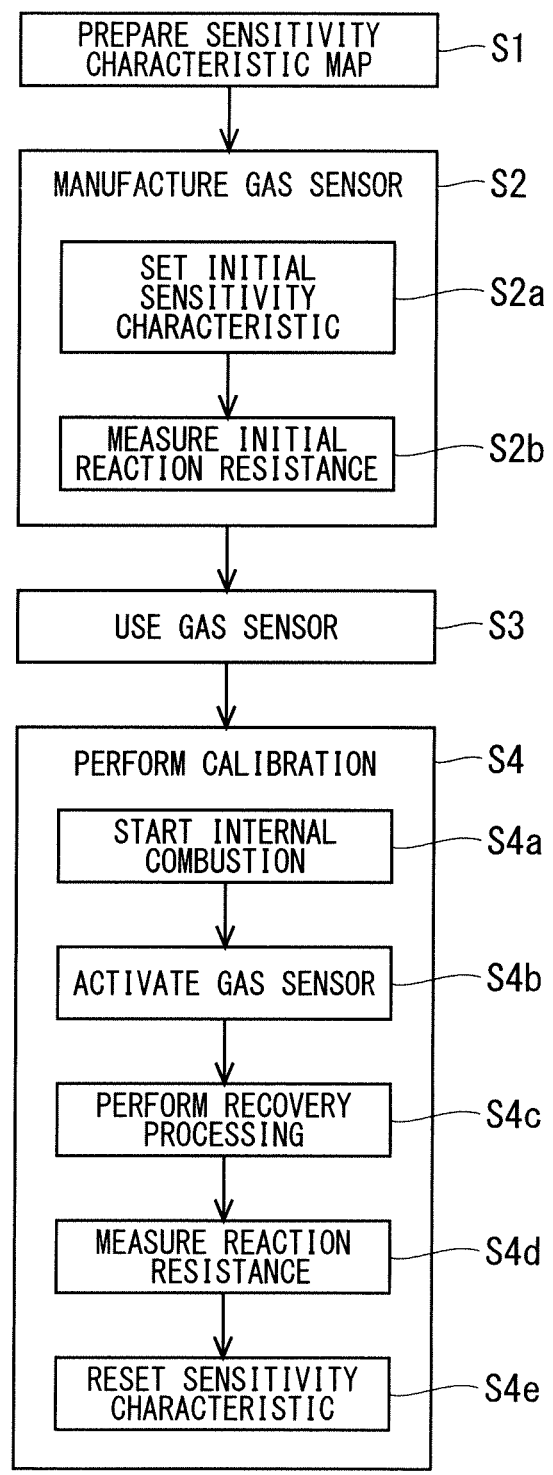
FIG. 14 is a diagram illustrating the flow of processing related to calibration.

In the present aspect, based on this point, the sensitivity characteristic is calibrated for the gas sensor 100A continuously used for a long term. FIG. 14 is a diagram illustrating the flow of processing related to calibration.

First, as preparations beforehand at manufacturing (mass production) of the gas sensor 100A in advance, sensitivity characteristic map information is prepared which provides a sensitivity characteristic map, as illustrated in FIG. 13 or 9, specifying the relation between the sensor output (EMF) of the gas sensor 100A as an unused specimen (initial specimen) and the concentration of a measurement target gas component for a predetermined range of the reaction resistance (or value of "reaction resistance/electrode area") (step S1). Preferably, the range of the reaction resistance for determining the sensitivity characteristic map information is set to mainly include a range equal to or smaller than the value of the reaction resistance corresponding to the sensitivity characteristic set to the initial specimen, in consideration that decrease of the reaction resistance due to long-term use as described above is to occur.

The preparation of the sensitivity characteristic map information is achieved by, for example, manufacturing a plurality of sensor elements 101A under manufacturing conditions same as that at mass production except for the Au maldistribution degree of the sensing electrode 10, performing complex impedance measurement on each sensor element 101A at a predetermined sensor drive temperature to measure the reaction resistance, and determining the sensor output value of each gas sensor 100A for a plurality of kinds of model gas including a measurement target gas component at different concentrations. In other words, the sensitivity characteristic map information includes a large number of data sets including, as data elements, the reaction resistance values, the gas concentration values, and the sensor output values obtained by the measurement. The prepared sensitivity characteristic map information is stored in a controller (for example, an ECU when the gas sensor is mounted on an automobile) (not illustrated) of the gas sensor 100A. The stored sensitivity characteristic map information is called out at an appropriate timing, and interpolated as necessary, for use. In the example illustrated in FIG. 9, the reaction resistance has four different values, and the gas concentration has five different values, but both may have a larger number of different values.

Alternatively, the sensitivity characteristic map information may be a combination of a sensitivity characteristic map indicating the relation between the Au maldistribution degree (the Au surface concentration or the Au abundance ratio) and the sensor output for an unused specimen or an initial specimen, as illustrated in FIG. 3, and information indicating the correlation between the reaction resistance and the Au maldistribution degree, as illustrated in FIG. 8.

When the gas sensor 100A is to be actually manufactured, the initial sensitivity characteristic is set in advance in view of, for example, a use status and a purpose, and then individual gas sensors 100A are manufactured under a condition under which the initial sensitivity characteristic is achieved (a condition that at least the Au surface concentration or the Au abundance ratio that provides the initial sensitivity characteristic is achieved at the sensing electrode 10) (step S2; S2a). In addition, the reaction resistance value (the initial reaction resistance) corresponding to the initial sensitivity characteristic is measured in advance and stored in the controller (step S2b).

Each manufactured gas sensor 100A is attached to a predetermined use position on, for example, an exhaust path of a diesel engine, and starts to be used (step S3).

The sensitivity characteristic is calibrated at an appropriate timing when the use continues for a long term (step S4).

Typically, the calibration is executed at a timing when the gas sensor is activated at start of an internal combustion (for example, an engine) (step S4a; S4b). In this case, recovery processing is executed first (step S4c).

The recovery processing removes a gas component in measurement gas adhered (adsorbed) to the sensing electrode 10 due to continuous use by predetermined electric processing or heating processing. As disclosed in Japanese Patent Application Laid-Open No. 2017-110967, the sensor output and the reaction resistance of the gas sensor 100A may decrease due to such adhesion (adsorption) of a gas component in some cases. If the calibration processing is performed without performing the recovery processing, the decrease of the reaction resistance due to Au evaporation and the decrease of the reaction resistance due to the adhesion of a gas component superimposingly occur, and therefore the former decrease of the reaction resistance cannot be correctly recognized. This is not preferable because the calibration cannot be accurately performed. Au evaporation from the sensing electrode 10 is irreversible, and thus the decrease of the reaction resistance due to the evaporation is also irreversible. However, the decrease of the sensor output and the reaction resistance due to the adhesion of a gas component is a reversible phenomenon solved by executing the recovery processing to remove the adhered gas. Thus, the sensitivity characteristic can be correctly calibrated by performing the recovery processing. It is considered that the decrease of the reaction resistance due to Au evaporation proceeds in a long term as compared to that due to the adhesion of a gas component.

The electric recovery processing is, for example, alternate application of positive and negative voltages between the sensing electrode 10 and the reference electrode 20 by using a dedicated external power source (not illustrated) or an external power source shared in an internal combustion system to which the gas sensor 100A is attached. The heating processing is, for example, heating by the heater 72.

When the recovery processing ends, the reaction resistance is measured by two-terminal complex impedance measurement applying alternating-current voltage between the sensing electrode 10 and the reference electrode 20 at different frequencies (step S4d). The measurement of the reaction resistance is preferably performed by using dedicated complex impedance measuring means or complex impedance measuring means common to another usage provided to an internal combustion system to which the gas sensor 100A is attached. Then, the sensitivity characteristic is reset, in other words, calibrated in accordance with the measured value of the reaction resistance. As an exemplary procedure, when the difference value between the obtained reaction resistance value and the initial reaction resistance is equal to or larger than a predetermined threshold, the sensitivity characteristic corresponding to the obtained reaction resistance value is acquired from the sensitivity characteristic map information and determined to be a new sensitivity characteristic. When the difference value is smaller than the threshold, the previous sensitivity characteristic is maintained.

Then, in the following use, the concentration of a measurement target gas component is determined based on the new sensitivity characteristic. Since the sensitivity characteristic is calibrated in this manner, decrease of the measurement accuracy is suitably prevented or reduced for the gas sensor 100A even when the gas sensor 100A is continuously used for a long term.

(Second Aspect: Evaluation Based on Direct-Current Resistance)

The calibration according to the first aspect described above needs to perform the complex impedance measurement at different frequencies to obtain the reaction resistance, and thus takes time for processing. In the present aspect, in order to more easily calibrate the sensitivity characteristic of the gas sensor 100A in a shorter time than in the first aspect, the direct-current resistance between the sensing electrode 10 and the reference electrode 20 is used as the alternative maldistribution degree index when the Au maldistribution degree is evaluated.

(Application to Unused Specimens)

Figure 15:
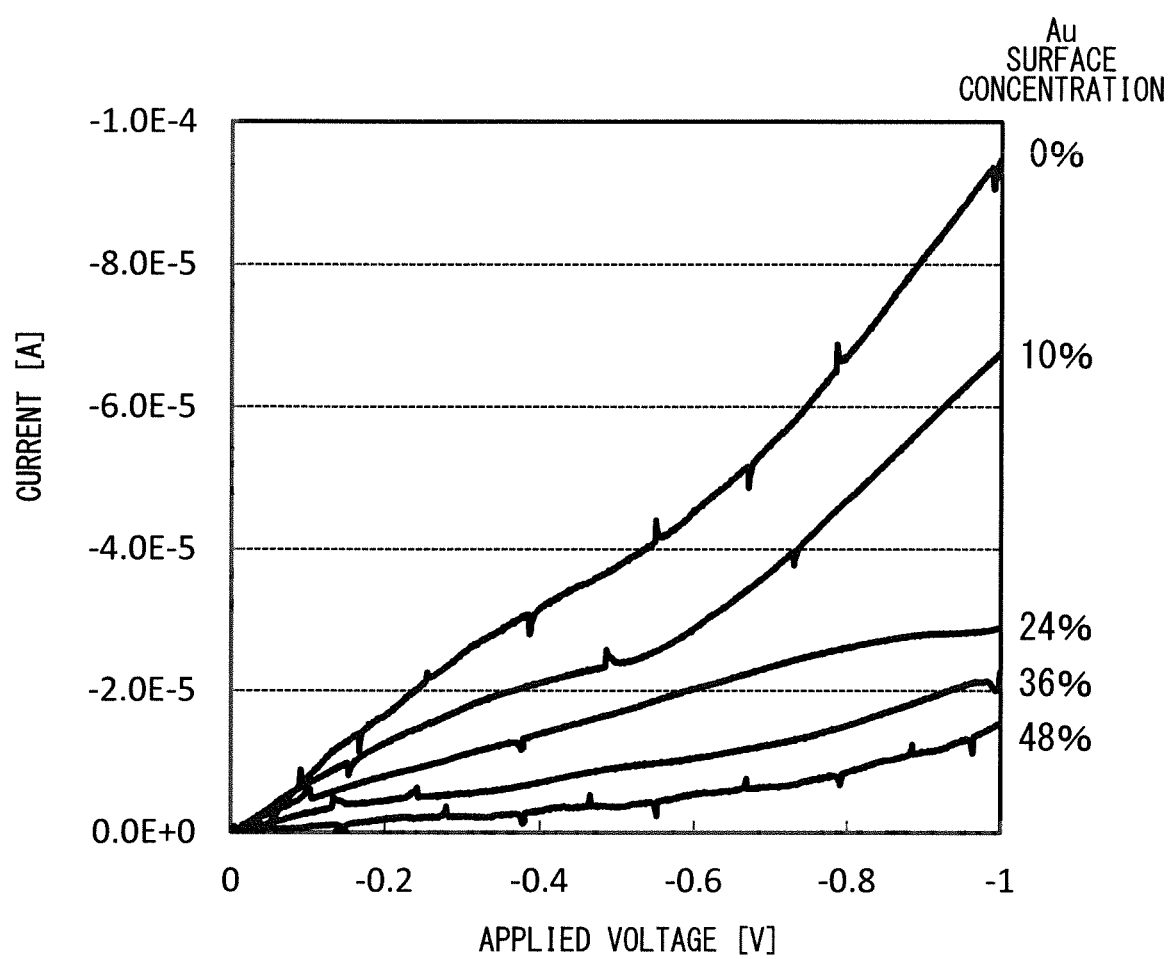
FIG. 15 is a diagram illustrating VI profiles of the five sensor elements 101A having different Au maldistribution degrees at the sensing electrode 10 when direct-current voltage is applied between the sensing electrode 10 and a reference electrode 20 at different voltage values at a sensor drive temperature of 640° C.

FIG. 15 is a diagram illustrating, for each of the five sensor elements 101A (unused specimens) having different Au maldistribution degrees (different Au surface concentrations) at the sensing electrode 10, which are used to obtain the reaction resistance in the first aspect, a change (V-I profile) of a measurement value of current flowing between the sensing electrode 10 and the reference electrode 20 to the applied voltage value, in the case that direct-current voltage was applied at different voltage values while the sensor drive temperature was set to 640° C. Measurement was performed under air atmosphere by using the complex impedance measurement device Versa STAT 4 (manufactured by AMETEK Inc.) used in the complex impedance measurement in the first aspect, while the sensing electrode 10 was connected to a WE/SE line and the reference electrode 20 was connected to a CE/RE line. The applied voltage value was differed between 0 V to −1 V. As understood from FIG. 15, the V-I profile differs in accordance with the Au maldistribution degree at the sensing electrode 10. Generally, at the same application voltage, the current value tends to be larger for the sensor element 101A having a smaller Au maldistribution degree. Table 2 shows the Au surface concentration (in units of %), the (direct-current) current value (in units of A) when the applied voltage value is −1 V, and the (direct-current) resistance value (in units of Ω) for each of the five sensor elements 101A. The resistance value is obtained by dividing the applied voltage value (−1 V) by each current value.

TABLE 2

| Au surface concentration (%) | Current (×10$^{-5}$ A) | Resistance (Ω) |
|---|---|---|
| 0 | −9.47 | 10560 |
| 10 | −6.77 | 14776 |
| 24 | −2.88 | 34678 |
| 36 | −2.27 | 44144 |
| 48 | −1.54 | 64934 |

Figure 16:
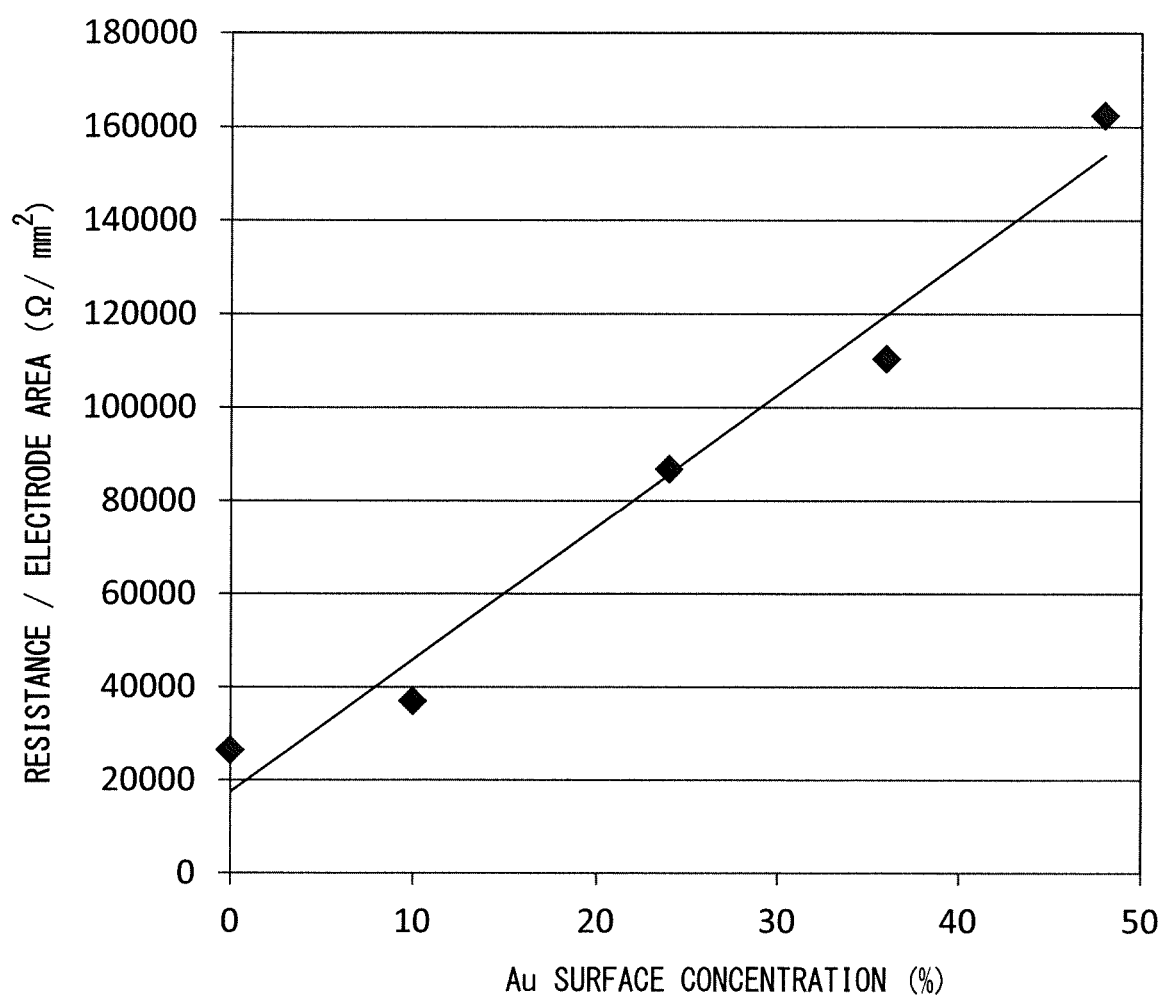
FIG. 16 is a diagram plotting the direct-current resistance value per unit area of the sensing electrode 10 against the Au surface concentration.

FIG. 16 is a diagram plotting, against the Au surface concentration, the value of "resistance/electrode area" (in units of Ω/mm$^2$), which is the value of direct-current resistance per unit area of the sensing electrode 10 and obtained by normalizing the resistance value shown in Table 2 with the area of the sensing electrode.

FIG. 16 also illustrates, for the plotting result, an approximate straight line calculated by least square approximation when the Au surface concentration is taken to be x and the "resistance/electrode area" is taken to be y. The function of the approximate straight line and the determination coefficient $R^2$ as the squared value of the correlation coefficient R are shown below. The area of the sensing electrode 10 is 0.4 mm$^2$.

y=2842.5x+17464, $R^2$=0.974.

As understood from FIG. 16 and the above-described value of the determination coefficient $R^2$, the (normalized) direct-current resistance value and the Au surface concentration have a linear relation (strong positive correlation) therebetween. The same result can be obtained at any other sensor drive temperature at least in the temperature range of 640° C. to 850° C. As a matter of course, when the direct-current resistance and the Au surface concentration have a linear relation therebetween, the direct-current resistance and the Au abundance ratio also have a linear relation therebetween. Although the direct-current resistance value is normalized with the area of the sensing electrode 10 in the above description, the similar linear relation can be obtained without normalization because the area of the sensing electrode 10 is typically the same between the sensor elements 101A manufactured under the same condition.

(Application to Long-Term Continuously Used Specimens)

The following describes that the direct-current resistance can be used as an alternative index (alternative maldistribution degree index) of the Au maldistribution degree in the gas sensor 100A suffering progress of Au evaporation due to long-term continuous use.

Similarly to the first aspect, consider an example in which the gas sensor 100A is an ammonia sensor attached to an exhaust path of a diesel engine and configured to sense ammonia gas as a measurement target gas component, the sensor drive temperature is 640° C., and the Au surface concentration of the sensing electrode 10 is 48% when the gas sensor 100A is unused (at an initial use stage). Samples A and B used in the first aspect are also used in the present aspect for discussion.

Figure 17:
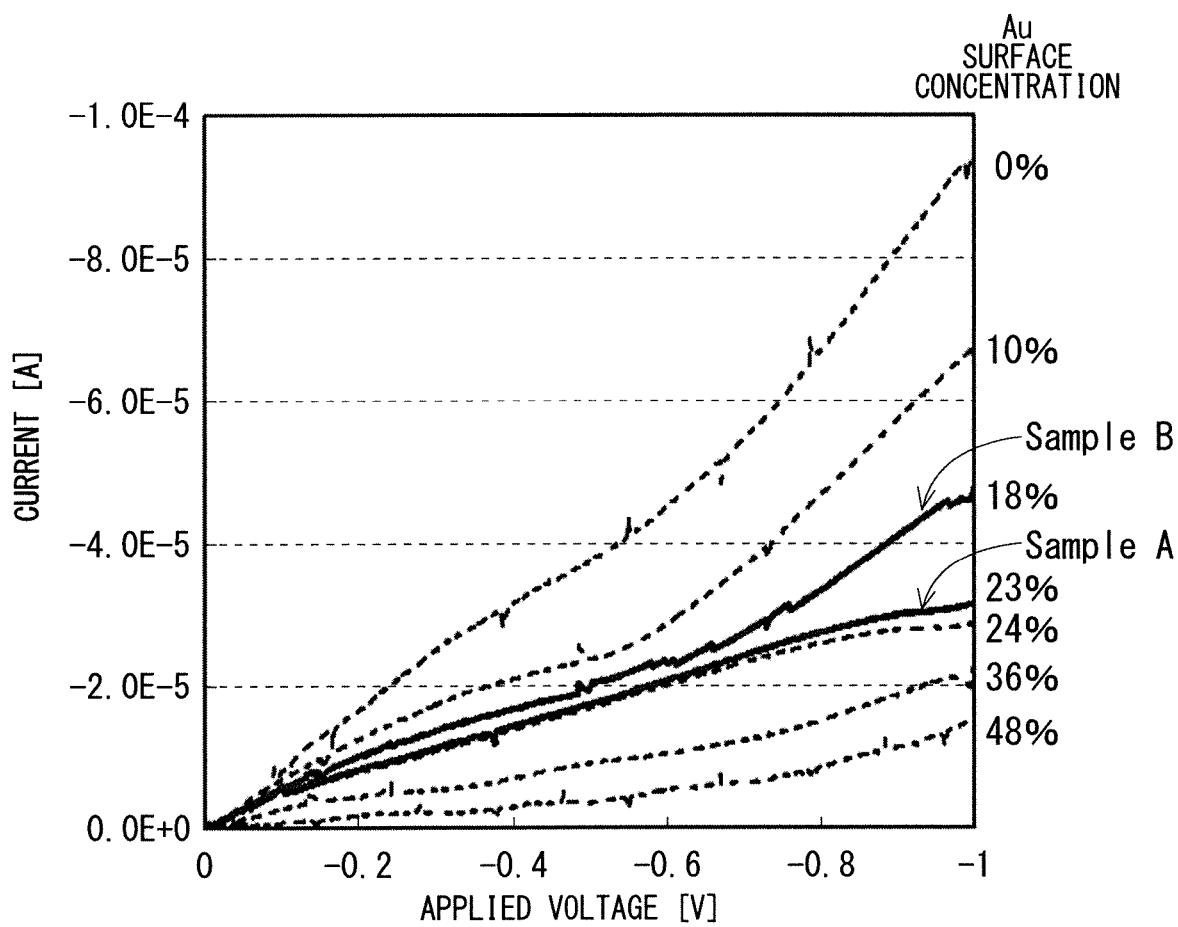
FIG. 17 is a diagram illustrating the VI profiles of Samples A and B when direct-current voltage is applied at different voltage values between the sensing electrode 10 and the reference electrode 20 at a sensor drive temperature of 640° C.

FIG. 17 is a diagram illustrating the VI profiles of Samples A and B when direct-current voltage is applied at different voltage values between the sensing electrode 10 and the reference electrode 20 at a sensor drive temperature of 640° C. Measurement was performed under conditions same as those at acquisition of the measurement result illustrated in FIG. 15. FIG. 17 also illustrates, with a dashed line, the result for an unused specimen illustrated in FIG. 15. Hereinafter, such an unused specimen is also referred to as an "initial" specimen.

FIG. 17 indicates that the gradient of each VI profile tends to decrease for a higher Au surface concentration irrespective of the unused specimen and Samples A and B.

Figure 18:
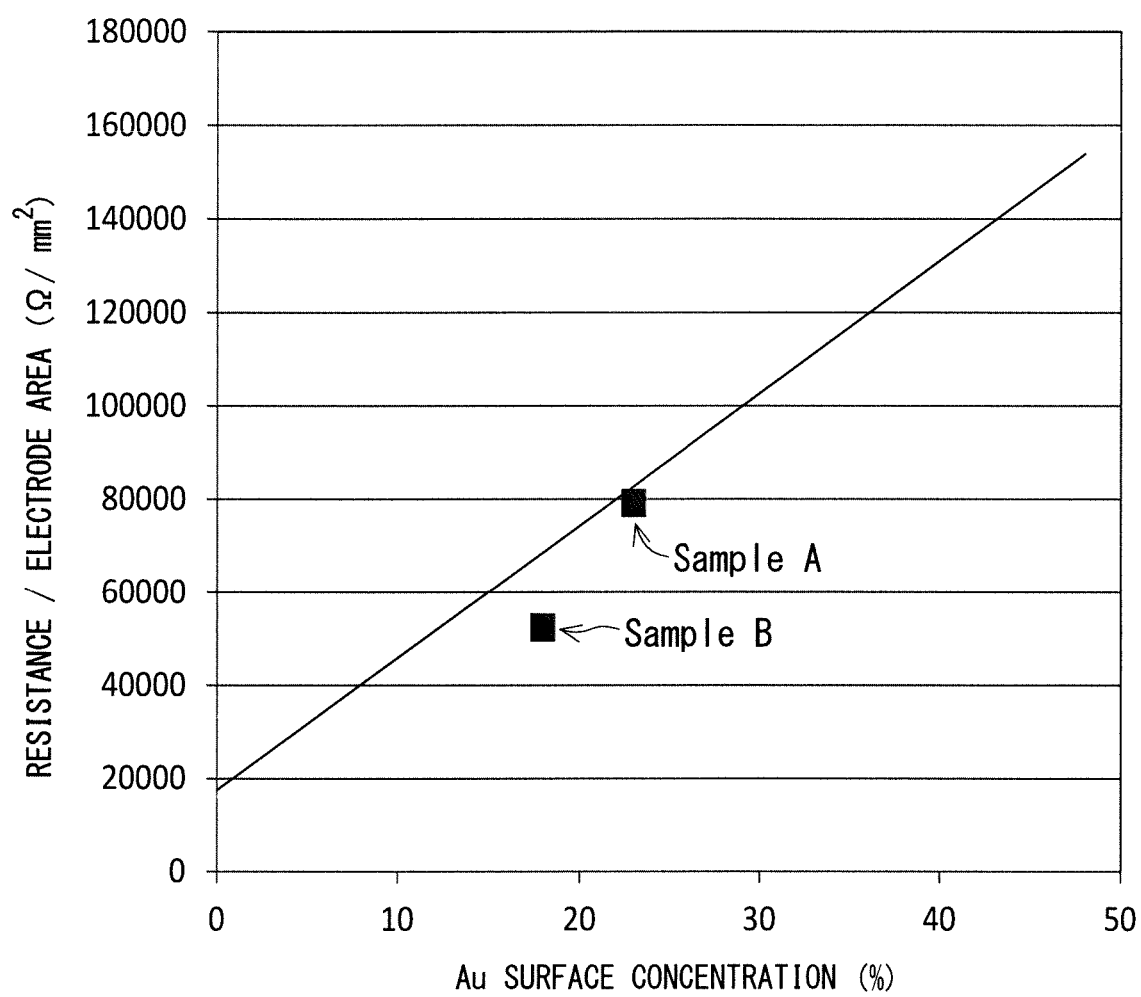
FIG. 18 illustrates a plot of the values of the direct-current resistance per unit area of Samples A and B against the respective Au surface concentrations thereof.

Similarly to FIG. 16, FIG. 18 illustrates a plot of the value of "resistance/electrode area" (in units of Ω/mm$^2$) as direct-current resistance value per unit area of the sensing electrode 10, which is obtained by normalizing the values of the direct-current resistances of Samples A and B when the applied voltage value is −1 V with the area of the sensing electrode, against the Au surface concentration. As described above, the area of the sensing electrode 10 is 0.4 mm$^2$. FIG. 18 also illustrates an approximate straight line (second initial specimen approximate straight line) obtained from the plot result illustrated in FIG. 16 for an unused specimen (initial specimen) at a sensor drive temperature of 640° C.

As understood from FIG. 18, the coordinate positions of Samples A and B are substantially on the second initial specimen approximate straight line. Similarly to the relation between the reaction resistance and the first initial specimen approximate straight line illustrated in FIG. 11, this suggests that when the gas sensor 100A is continuously used for a long term at a predetermined sensor drive temperature, degradation (decrease of the Au surface concentration and the reaction resistance) of the gas sensor 100A due to progress of Au evaporation from the sensing electrode 10 occurs along the correlation between the Au surface concentration and the direct-current resistance at the sensor drive temperature for an unused specimen (initial specimen), which is expressed by the second initial specimen approximate straight line.

In FIG. 18, the coordinate positions of a long-term continuously used specimen for the direct-current resistance and the Au surface concentration are along the second initial specimen approximate straight line. This indicates that, the relation represented by the second initial specimen approximate straight line between the direct-current resistance and the Au surface concentration at a predetermined applied voltage can be directly applied to a long-term continuously used specimen. Accordingly, for the gas sensor 100A, irrespective of whether it is an unused specimen or a long-term continuously used specimen, the direct-current resistance at a predetermined applied voltage can be used as an index (alternative maldistribution degree index) of the Au maldistribution degree, in place of the Au surface concentration (or the Au abundance ratio), based on the second initial specimen approximate straight line.

For example, once the second initial specimen approximate straight line as illustrated in FIG. 18 or 16 is specified for an unused specimen at a predetermined applied voltage in advance, the direct-current resistance at the applied voltage only needs to be measured at an appropriate timing for any gas sensor 100A fabricated under an identical condition, while the gas sensor 100A is in use, for allowing to evaluate the Au surface concentration or the Au abundance ratio of the sensing electrode 10 based on the measured value and the second initial specimen approximate straight line. Furthermore, the degree of degradation (the degree of Au evaporation) of the sensing electrode 10 can be determined from the magnitude of a difference value from an initial value.

(Calibration of Sensitivity Characteristic)

As described above, the sensor output (EMF) of measurement of ammonia ($NH_3$) gas as a measurement target component and the Au surface concentration of the sensing electrode 10 have the relation illustrated in FIG. 12 for Samples A and B. The sensitivity characteristic (initial sensitivity characteristic) of the initial specimen is changed by Au evaporation from the surface of the sensing electrode 10 due to continuous use of the gas sensor 100A. In principle, the change of the sensitivity characteristic may be grasped as change along the relation between the Au surface concentration of the sensing electrode 10 and the sensor output for an unused specimen (initial specimen).

However, it is impossible to measure the Au surface concentration of the gas sensor 100A in use. Thus, in the first aspect described above, the sensitivity characteristic map information that provides the sensitivity characteristic map illustrated in FIG. 13 with the value of "reaction resistance/electrode area" as the horizontal axis illustrated in FIG. 12 in place of the Au surface concentration is prepared in advance at manufacturing (mass production) of the gas sensor 100A, and the sensitivity characteristic of the gas sensor 100A being continuously used for a long term is calibrated based on the sensitivity characteristic map information.

The same approach is also possible in the present aspect. Specifically, similarly to the first aspect, once the sensitivity characteristic map information that provides a sensitivity characteristic map with the value of "resistance/electrode area" as the horizontal axis illustrated in FIG. 12 in place of the Au surface concentration is prepared in advance at manufacturing (mass production) of the gas sensor 100A, the sensitivity characteristic of the gas sensor 100A being continuously used for a long term can be calibrated based on the sensitivity characteristic map information.

The flow of processing following the creation of the sensitivity characteristic map information is same as that illustrated in FIG. 14 except for measurement of the direct-current resistance value in place of measurement (complex impedance measurement) of the reaction resistance at steps S2*b* and S4*d*.

The sensitivity characteristic map information may be a combination of a sensitivity characteristic map indicating the relation between the Au maldistribution degree (the Au surface concentration or the Au abundance ratio) and the sensor output for an unused specimen or an initial specimen, as illustrated in FIG. 3, and information indicating the correlation between the reaction resistance and the Au maldistribution degree, as illustrated in FIG. 16.

In the second aspect, measurement performed on the sensor elements 101A as individual inspection targets in the inspection process only involves single current measurement with application of a predetermined direct-current voltage value (for example, −1 V). Thus, in the second aspect, inspection can be performed faster than in the first aspect in which measurement needs to be repeated with different frequencies of alternating-current voltage to obtain the reaction resistance value.

Alternatively, since the linear relation between the direct-current resistance value and the Au surface concentration or the Au abundance ratio as illustrated in FIG. 16 is determined at a constant applied voltage value, the relation between the current value and the Au surface concentration or the Au abundance ratio may be specified in advance (in other words, the current value may be used as an alternative maldistribution degree index) and stored as the sensitivity characteristic map information, so that calibration is performed based on the relation.

As described above, according to the present preferred embodiment, as an alternative index of the Au maldistribution degree at the sensing electrode provided to a sensor element of a mixed-potential type gas sensor, the reaction resistance between the sensing electrode and a reference electrode or the direct-current resistance therebetween at a predetermined applied voltage is adopted. With this configuration, the degree of degradation of a sensing electrode in the gas sensor being continuously used can be determined. Moreover, the sensitivity characteristic of the gas sensor can be calibrated so as to suit the Au maldistribution degree, based on the difference in the reaction resistance value or the direct-current resistance value between an initial specimen and a long-term continuously used specimen, thereby preventing or reducing degradation of measurement accuracy even when the gas sensor is continuously used.

While the invention has been shown and described in detail, the foregoing description is in all aspects illustrative and not restrictive. It is therefore understood that numerous modifications and variations can be devised without departing from the scope of the invention.

What is claimed is:

1. A calibration method for a mixed-potential type gas sensor including a sensor element made of an oxygen-ion conductive solid electrolyte, said sensor element comprising:

a sensing electrode containing Pt and Au as noble metal components and configured to sense a predetermined measurement target gas component in measurement gas, Au being concentrated at a predetermined maldistribution degree on a surface of a noble metal particle;
a reference electrode disposed in air; and
a heater configured to heat said sensor element,
said gas sensor being configured to determine a concentration of said measurement target gas component based on a sensitivity characteristic as a predetermined functional relation held between a sensor output and the concentration of said measurement target gas component, said sensor output being a potential difference generated between said sensing electrode and said reference electrode when said sensor element is heated to a predetermined sensor drive temperature by said heater,
wherein, in said calibration method, said sensitivity characteristic is calibrated so as to suit said maldistribution degree, based on a value of a predetermined alternative maldistribution degree index acquired in a non-destructive manner by performing predetermined measurement while said sensor element is heated to said predetermined temperature by said heater.

2. The gas sensor calibration method according to claim 1, wherein said predetermined measurement is complex impedance measurement to determine a reaction resistance between said sensing electrode and said reference electrode at said sensor drive temperature, and said reaction resistance is used as said alternative maldistribution degree index.

3. The gas sensor calibration method according to claim 1, wherein said predetermined measurement is measurement of a direct-current resistance value between said sensing electrode and said reference electrode when a predetermined direct-current voltage is applied between said sensing electrode and said reference electrode, and said direct-current resistance value is used as the alternative maldistribution degree index.

4. The gas sensor calibration method according to claim 1, wherein said predetermined measurement is measurement of a direct-current current value flowing between said sensing electrode and said reference electrode when a predetermined direct-current voltage is applied between said sensing electrode and said reference electrode, and said direct-current current value is used as said alternative maldistribution degree index.

5. The gas sensor calibration method according to claim 1, comprising the steps of:
a) preparing, before start of use of said gas sensor, sensitivity characteristic map information that specifies a relation between said sensor output and the concentration of said measurement target gas component in accordance with the value of said alternative maldistribution degree index for a predetermined range of said alternative maldistribution degree index;
b) measuring the value of said alternative maldistribution degree index at a predetermined timing after the start of use of said gas sensor; and
c) calibrating, based on the value of said alternative maldistribution degree index measured in said step b) and said sensitivity characteristic map information, said sensitivity characteristic in accordance with the measured value of said alternative maldistribution degree index.

6. The gas sensor calibration method according to claim 5, further comprising the step of:
d) removing a gas component in said measurement gas adhering to said sensing electrode through energization to said sensing electrode or heating of said sensor element by said heater,
wherein said step b) follows said step d).

7. The gas sensor calibration method according to claim 2, the method comprising the steps of:
a) preparing, before start of use of said gas sensor, sensitivity characteristic map information that specifies a relation between said sensor output and the concentration of said measurement target gas component in accordance with the value of said alternative maldistribution degree index for a predetermined range of said alternative maldistribution degree index;
b) measuring the value of said alternative maldistribution degree index at a predetermined timing after the use of said gas sensor is started; and
c) calibrating, based on the value of said alternative maldistribution degree index measured in said step b) and said sensitivity characteristic map information, said sensitivity characteristic in accordance with the measured value of said alternative maldistribution degree index.

8. The gas sensor calibration method according to claim 7, further comprising the step of:
d) removing a gas component in said measurement gas adhering to said sensing electrode through energization to said sensing electrode or heating of said sensor element by said heater,
wherein said step b) follows said step d).

9. The gas sensor calibration method according to claim 3, the method comprising the steps of:
a) preparing, before start of use of said gas sensor, sensitivity characteristic map information that specifies a relation between said sensor output and the concentration of said measurement target gas component in accordance with the value of said alternative maldistribution degree index for a predetermined range of said alternative maldistribution degree index;
b) measuring the value of said alternative maldistribution degree index at a predetermined timing after the start of use of said gas sensor; and
c) calibrating, based on the value of said alternative maldistribution degree index measured in said step b) and said sensitivity characteristic map information, said sensitivity characteristic in accordance with the measured value of said alternative maldistribution degree index.

10. The gas sensor calibration method according to claim 9, further comprising the step of:
d) removing a gas component in said measurement gas adhering to said sensing electrode through energization to said sensing electrode or heating of said sensor element by said heater,
wherein said step b) follows said step d).

11. The gas sensor calibration method according to claim 4, comprising the steps of:
a) preparing, before start of use of said gas sensor, sensitivity characteristic map information that specifies a relation between said sensor output and the concentration of said measurement target gas component in accordance with the value of said alternative maldistribution degree index for a predetermined range of said alternative maldistribution degree index;
b) measuring the value of said alternative maldistribution degree index at a predetermined timing after the start of use of said gas sensor; and c) calibrating, based on the value of said alternative maldistribution degree index measured in said step b) and said sensitivity characteristic map information, said sensitivity characteristic in accordance with the measured value of said alternative maldistribution degree index.

12. The gas sensor calibration method according to claim 11, further comprising the step of:

d) removing a gas component in said measurement gas adhering to said sensing electrode through energization to said sensing electrode or heating of said sensor element by said heater, wherein said step b) follows said step d).

* * * * *